(12) United States Patent
Nivala et al.

(10) Patent No.: US 11,946,812 B2
(45) Date of Patent: Apr. 2, 2024

(54) FOOD THERMOMETER AND METHOD OF USING THEREOF

(71) Applicant: Apption Labs Limited, Leicester (GB)

(72) Inventors: Teemu Nivala, Leicester (GB); Joseph Cruz, Encino, CA (US)

(73) Assignee: Apption Labs Limited, Leicester (GB)

( * ) Notice: Subject to any disclaimer, the term of this patent is extended or adjusted under 35 U.S.C. 154(b) by 621 days.

(21) Appl. No.: 17/098,365

(22) Filed: Nov. 14, 2020

(65) Prior Publication Data
US 2022/0049992 A1 Feb. 17, 2022

Related U.S. Application Data

(60) Continuation-in-part of application No. 16/734,354, filed on Jan. 5, 2020, now Pat. No. 11,506,545, which
(Continued)

(51) Int. Cl.
*G01K 1/024* (2021.01)

(52) U.S. Cl.
CPC ......... *G01K 1/024* (2013.01); *G01K 2207/02* (2013.01); *G01K 2207/06* (2013.01)

(58) Field of Classification Search
CPC . G01K 1/024; G01K 2207/02; G01K 2207/06
See application file for complete search history.

(56) References Cited

U.S. PATENT DOCUMENTS 3,815,113 A * 6/1974 Welch ............. G01K 3/005
            327/449
4,086,813 A * 5/1978 Meek ............. G01K 1/08
            99/421 TP
(Continued)

FOREIGN PATENT DOCUMENTS

DE            4421373 A1    12/1995
DE    102009019613 A1    11/2010
(Continued)

OTHER PUBLICATIONS

International Search Report and Written Opinion dated Mar. 30, 2022 from counterpart International Application No. PCT/IB2021/060513, 17 pages.
(Continued)

*Primary Examiner* — Nathaniel T Woodward
*Assistant Examiner* — Philip L Cotey
(74) *Attorney, Agent, or Firm* — TraskBritt

(57) ABSTRACT

A food thermometer includes a tip portion and an outer shell including a minimum food insertion depth indicator visible on an exterior of the outer shell. A thermal barrier member is located inside the outer shell along a center virtual axis defined by the outer shell at or adjacent a projected position of the minimum food insertion depth indicator on the virtual axis, or closer to the tip portion than the orthogonally projected position of the minimum food insertion depth indicator. In another aspect, a food thermometer includes a first portion and a second portion connected to the first portion. A third portion connected to the second portion includes an antenna. A thermal barrier member is located in at least one of the first portion and the second portion to thermally insulate the interior of the first portion from at least a portion of the interior of the second portion.

30 Claims, 24 Drawing Sheets

Related U.S. Application Data is a continuation-in-part of application No. 16/037,832, filed on Jul. 17, 2018, now Pat. No. 10,670,470, which is a division of application No. 15/192,850, filed on Jun. 24, 2016, now Pat. No. 10,024,736.

(60) Provisional application No. 62/184,775, filed on Jun. 25, 2015.

(56) References Cited

U.S. PATENT DOCUMENTS

| | | | | |
|---|---|---|---|---|
| 4,230,731 A * | 10/1980 | Tyler | H05B 6/6467 | 426/243 |
| 4,297,557 A * | 10/1981 | Tyler | H05B 6/6467 | 340/870.18 |
| 4,301,509 A * | 11/1981 | Haase | F24C 7/006 | 219/494 |
| 4,475,024 A * | 10/1984 | Tateda | H05B 6/6467 | 374/149 |
| 5,030,294 A * | 7/1991 | Burley | G01K 1/08 | 136/232 |
| 5,194,857 A * | 3/1993 | Gomez | G08B 5/228 | 455/343.1 |
| 5,272,302 A * | 12/1993 | Dudley | H05B 6/6402 | 219/744 |
| 6,080,972 A * | 6/2000 | May | F24C 7/087 | 219/486 |
| 6,486,453 B1 * | 11/2002 | Bales | H05B 6/6435 | 219/400 |
| 6,550,963 B2 * | 4/2003 | Daily | G01K 1/026 | 136/211 |
| 6,568,848 B1 * | 5/2003 | Chapman | G01K 1/024 | 374/E1.004 |
| 6,587,739 B1 * | 7/2003 | Abrams | G05B 15/02 | 7/110 |
| 6,712,505 B2 * | 3/2004 | Chapman | G01K 1/024 | 374/E1.004 |
| 6,750,433 B2 * | 6/2004 | Guenther | F24C 7/085 | 219/490 |
| 6,753,027 B1 * | 6/2004 | Greiner | H05B 6/6452 | 374/E7.042 |
| 6,759,635 B2 * | 7/2004 | Lile | A47J 37/1266 | 219/494 |
| 6,809,301 B1 * | 10/2004 | McIntyre | F24C 7/082 | 99/325 |
| 6,949,729 B1 * | 9/2005 | Ishikawa | H05B 6/688 | 700/211 |
| 7,075,442 B2 * | 7/2006 | Lion | G01K 1/024 | 374/E1.004 |
| 7,092,988 B1 * | 8/2006 | Bogatin | H04L 67/025 | 700/211 |
| 7,102,107 B1 * | 9/2006 | Chapman | F24C 7/082 | 219/710 |
| 7,128,466 B2 * | 10/2006 | Chang | F24C 7/08 | 374/149 |
| 7,129,834 B2 * | 10/2006 | Naruse | G01K 1/026 | 374/E1.005 |
| 7,201,099 B2 * | 4/2007 | Harris, Jr. | G01K 1/02 | 374/E1.002 |
| 7,202,454 B2 * | 4/2007 | Wiedemann | G01K 3/005 | 219/710 |
| 7,372,368 B2 * | 5/2008 | Chapman | G04G 21/04 | 340/584 |
| 7,381,933 B2 * | 6/2008 | Cristiani | G01K 1/14 | 374/149 |
| 7,703,389 B2 * | 4/2010 | McLemore | A47J 37/1209 | 99/410 |
| 7,964,824 B2 * | 6/2011 | Moon | F24C 7/08 | 219/448.11 |
| 8,145,854 B1 * | 3/2012 | Lee | G06Q 10/06316 | 99/325 |
| 8,188,409 B2 * | 5/2012 | Baier | G01K 13/00 | 219/709 |
| 8,222,578 B2 * | 7/2012 | Beier | G01K 1/024 | 426/233 |
| 8,556,502 B2 * | 10/2013 | Austen | G01K 1/026 | 374/110 |
| 8,557,317 B2 * | 10/2013 | Sonnendorfer | F24C 7/08 | 426/523 |
| 8,715,204 B2 * | 5/2014 | Webster | G01K 1/024 | 600/549 |
| 8,730,038 B2 * | 5/2014 | Durian | F24C 7/082 | 99/422 |
| 8,931,400 B1 * | 1/2015 | Allen | A47J 36/00 | 99/344 |
| 9,411,989 B2 * | 8/2016 | Wild | G08B 21/0275 | |
| 9,799,199 B2 * | 10/2017 | Allen | G01K 1/024 | |
| 10,067,004 B1 * | 9/2018 | Allen | G01K 13/00 | |
| 10,388,141 B2 * | 8/2019 | Allen, Sr. | H04Q 9/00 | |
| 10,667,638 B2 * | 6/2020 | Sun | A47J 36/00 | |
| 2003/0127451 A1 * | 7/2003 | Lile | A47J 37/06 | 219/506 |
| 2006/0016806 A1 * | 1/2006 | Cristiani | G01K 1/14 | 374/E1.004 |
| 2007/0042091 A1 * | 2/2007 | Rund | G01K 7/42 | 374/E7.042 |
| 2007/0215599 A1 * | 9/2007 | Kahler | G01K 7/42 | 374/E7.042 |
| 2008/0043809 A1 * | 2/2008 | Herbert | G01K 1/026 | 374/E1.005 |
| 2008/0259995 A1 * | 10/2008 | Kuhn | G01K 7/32 | 374/E1.004 |
| 2009/0188396 A1 * | 7/2009 | Hofmann | H05B 6/6452 | 99/421 H |
| 2010/0012645 A1 * | 1/2010 | Baier | G01K 13/00 | 219/413 |
| 2012/0063488 A1 * | 3/2012 | Nakayama | G01K 1/10 | 374/185 |
| 2012/0203082 A1 * | 8/2012 | Livneh | A61B 17/00234 | 600/109 |
| 2012/0225170 A1 * | 9/2012 | Sonnendorfer | F24C 7/08 | 116/216 |
| 2013/0206015 A1 * | 8/2013 | Jacoby | A47J 37/07 | 99/330 |
| 2013/0269539 A1 * | 10/2013 | Polt | F24C 7/085 | 99/331 |
| 2013/0277353 A1 * | 10/2013 | Joseph | H05B 1/0263 | 219/209 |
| 2015/0064314 A1 * | 3/2015 | Manuel | A23L 5/10 | 707/731 |
| 2015/0194041 A1 * | 7/2015 | Allen | G08B 21/182 | 340/584 |
| 2015/0290795 A1 * | 10/2015 | Oleynik | B25J 9/0081 | 700/257 |
| 2016/0051078 A1 * | 2/2016 | Jenkins | F24C 7/08 | 99/341 |
| 2016/0069853 A1 * | 3/2016 | Mitchell | A47J 37/0664 | 374/142 |
| 2016/0327279 A1 * | 11/2016 | Bhogal | F24C 15/008 | |
| 2017/0150841 A1 * | 6/2017 | Johncock | G05B 15/02 | |
| 2017/0248474 A1 * | 8/2017 | Nielsen | G01K 1/024 | |
| 2019/0266876 A1 * | 8/2019 | Allen, Sr. | A47J 36/321 | |

FOREIGN PATENT DOCUMENTS

| | | |
|---|---|---|
| DE | 202010016860 U1 | 3/2011 |
| DE | 102009047418 A1 | 6/2011 |
| DE | 102010063474 | 6/2012 |
| DK | 178659 B1 | 10/2016 |
| EP | 1081476 B1 | 3/2001 |
| EP | 1577653 A1 | 9/2005 |
| EP | 1624724 A1 | 2/2006 |
| EP | 1646851 A1 | 4/2006 |
| GB | 2206222 A | 12/1988 |
| GB | 2203320 B | 5/1991 |
| JP | 58135428 A | 8/1983 |
| WO | 0170087 A2 | 9/2001 |
| WO | 2010023237 A1 | 3/2010 |

(56) References Cited

FOREIGN PATENT DOCUMENTS

| WO | 2011067176 A1 | 6/2011 |
| WO | 2016210356 A1 | 12/2016 |
| WO | 2019052613 A1 | 3/2019 |

OTHER PUBLICATIONS

International Search Report and Written Opinion dated Apr. 21, 2021 from International Application No. PCT/IB2020/062410, 13 pages.
Bluetooth BBQ Thermometer—Cappec—Consumer Electronics, accessed Jun. 8, 2015 at http://cappec.com/product/bluetooth-bbq-thermometer/3 pages.
Brookstone Grill Alert Talking Remote Meat Thermometer, accessed Jun. 8, 2015 at http://brookstone.com/grill-alert-talking-remote-meat-thermometers 2 pages.
Grill Thermometer, accessed Jun. 8, 2015 at http://idevicesinc.com/igrill 5 pages.
Tappecue Temperature Monitoring System, accessed Jun. 8, 2015 at http://www.tappecue.com 1 page.
Written Opinion of the International Searching Authority in related International Application No. PCT/US2016/039405, 10 pages.

\* cited by examiner

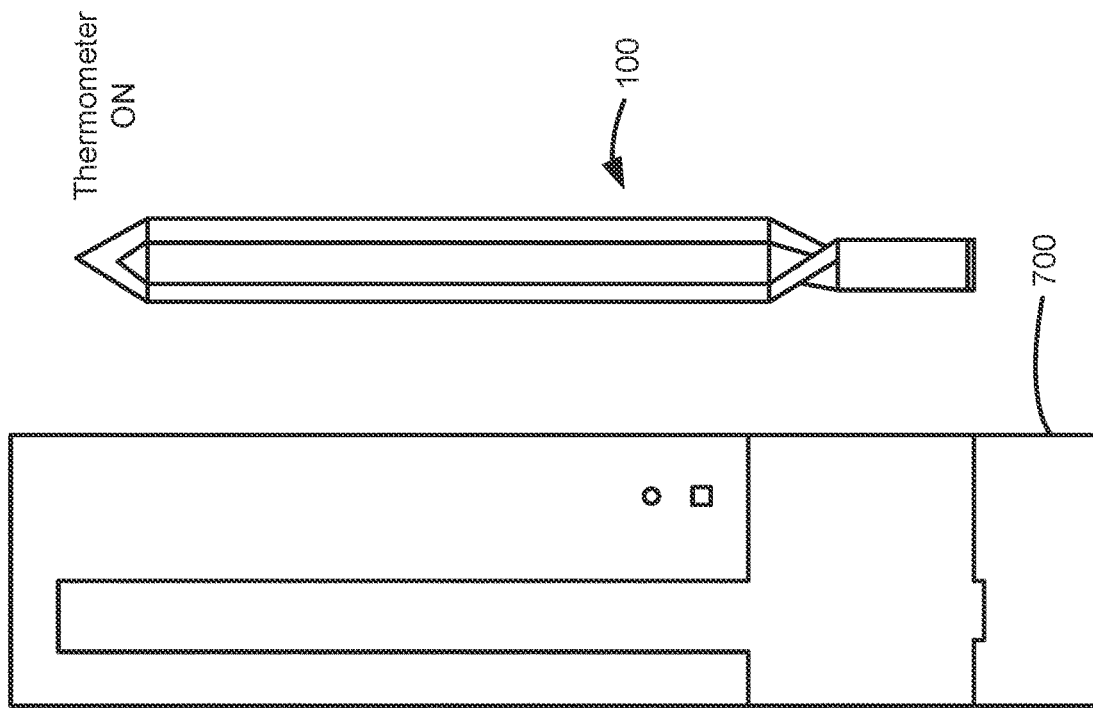
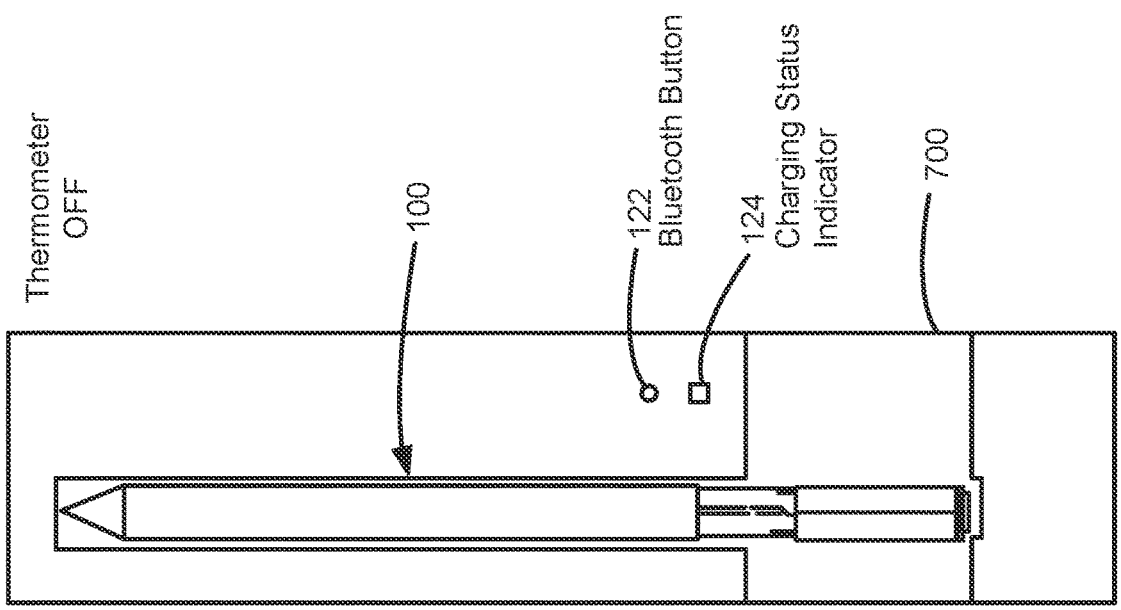

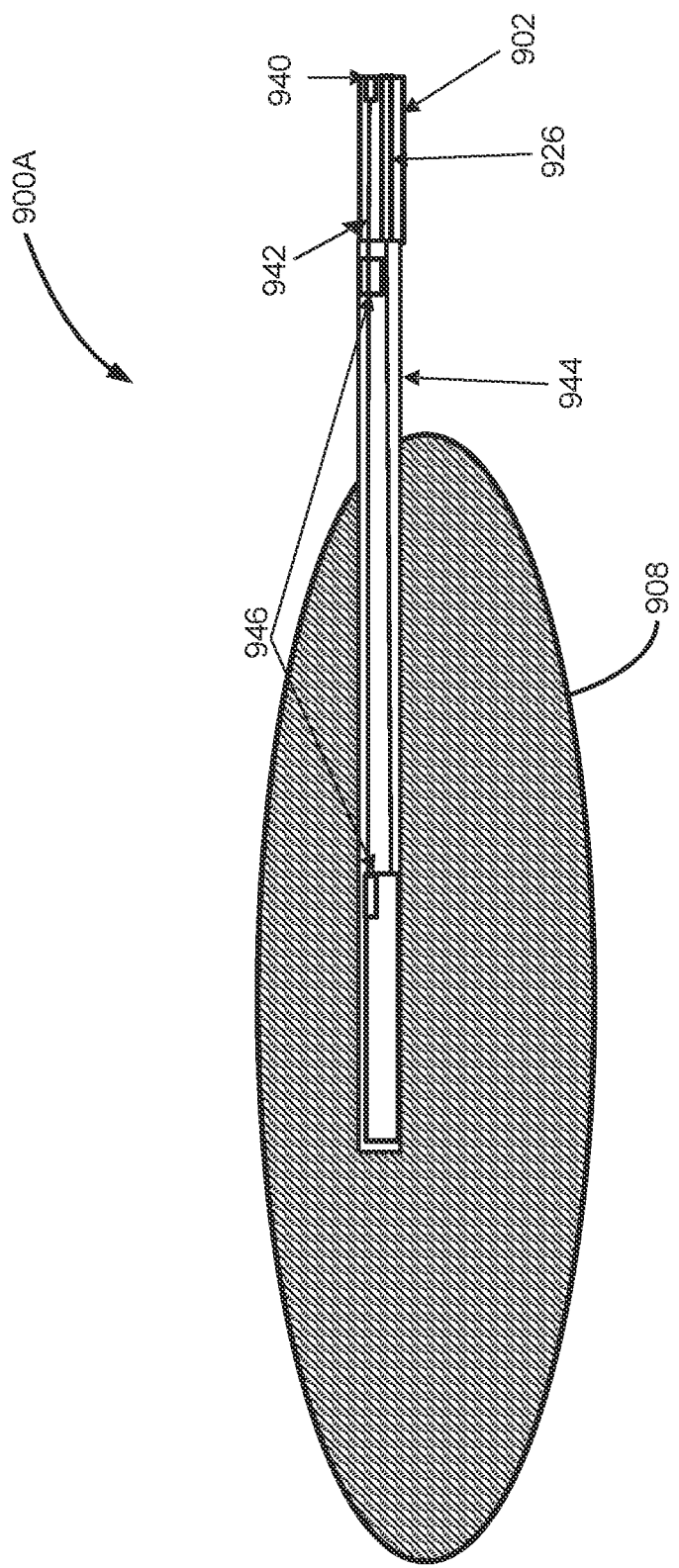

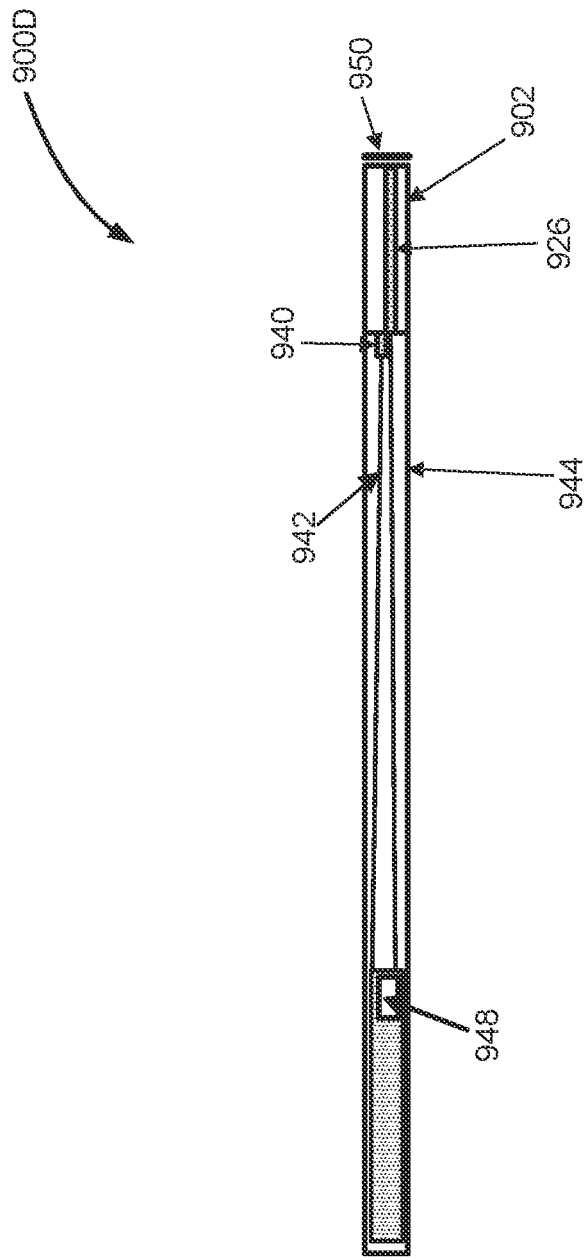

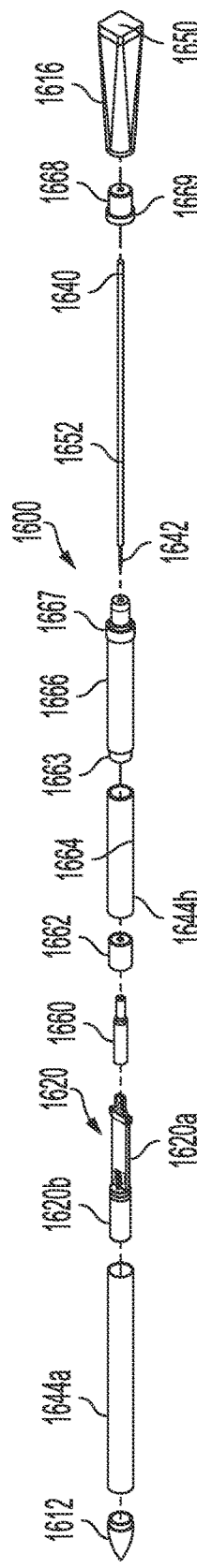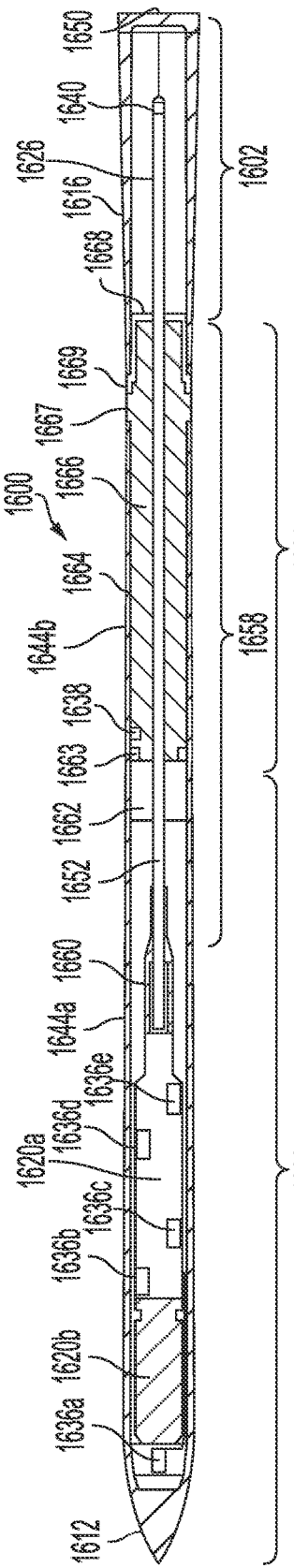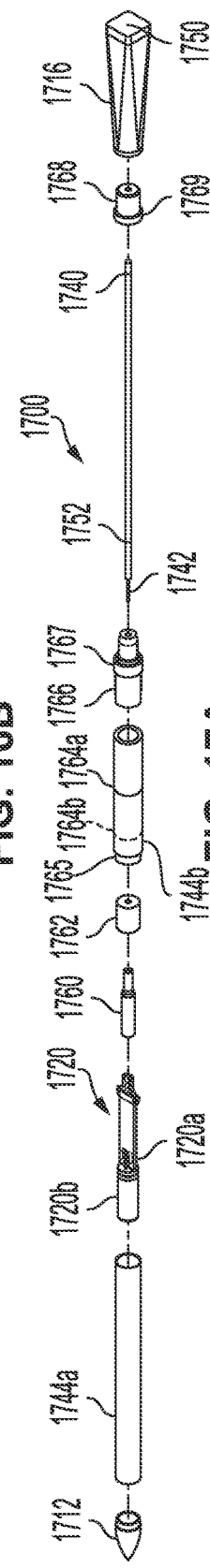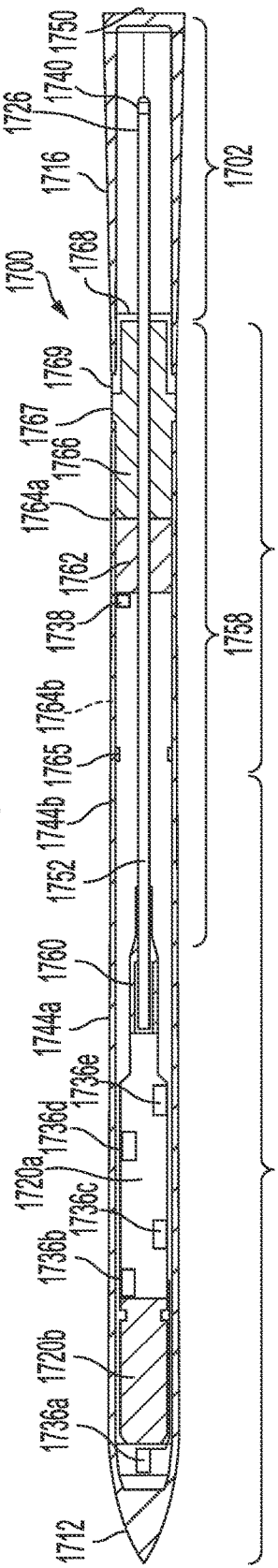

FOOD THERMOMETER AND METHOD OF USING THEREOF

CROSS REFERENCE TO RELATED APPLICATIONS

This application claims priority to U.S. application Ser. No. 17/098,365, filed on Nov. 14, 2020, which is a continuation-in-part of U.S. application Ser. No. 16/734,354, filed on Jan. 5, 2020, now U.S. Pat. No. 11,506,545, issued Nov. 22, 2022, which is a continuation-in-part of U.S. application Ser. No. 16/037,832, filed Jul. 17, 2018, now U.S. Pat. No. 10,670,470, issued Jun. 2 2020,which is a divisional application of U.S. application Ser. No. 15/192,850, filed on Jun. 24, 2016, now U.S. Pat. No. 10,024,736, issued Jul. 17, 2018, which claims the benefit of U.S. Provisional Application No. 62/184,775, filed on Jun. 25, 2015, and entitled "SMART MEAT THERMOMETER AND METHOD OF USING THEREOF." Each of U.S. application Ser. Nos. 17/098,365, 16/734,354, 16/037,832 and 15/192,850, and U.S. Provisional Application No. 62/184,775 is hereby incorporated by reference in its entirety.

FIELD

The present disclosure relates to food thermometers and methods of using thereof. More particularly, the present disclosure relates to a food thermometer that wirelessly transmits data.

BACKGROUND

Food thermometers such as meat thermometers have been used to help provide more consistent cooking results. The use of a meat thermometer, for example, can provide a visual indication on whether the meat is still undercooked or if the meat is in danger of being overcooked. However, these conventional types of food thermometers provide a passive indication of temperature and generally rely on the cook to remember to check the temperature.

More recently wireless food thermometers have been introduced to provide a more convenient display of the temperature. However, such wireless food thermometers generally provide only a passive display of the temperature and may not provide sufficiently accurate information during cooking, such as a completion time, when to adjust a temperature, when to start or finish a particular cooking stage such as searing, or how long to let the food rest after removing it from heat. In addition, such wireless food thermometers have a limited range for transmitting information, especially in light of the challenges to conserve space, provide a waterproof enclosure, and withstand high temperatures.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 9A shows a charging apparatus for charging a battery of a food thermometer according to an embodiment.

FIG. 9B shows the thermometer of FIG. 9A removed from the charging apparatus.

FIG. 11A shows a food thermometer including an ambient thermal sensor according to an embodiment.

FIG. 11D, shows a food thermometer including a charging contact according to an embodiment.

FIG. 16A is an assembly view of a food thermometer including a thermal barrier member in a first portion of the food thermometer that is closer to a tip portion of the food thermometer than a minimum food insertion depth indicator according to an embodiment.

FIG. 16B is an assembled cross-section view of the food thermometer of FIG. 16A.

FIG. 17A is an assembly view of a food thermometer including a thermal barrier member using a glass-to-metal seal in a second or middle portion of the food thermometer according to an embodiment.

FIG. 17B is an assembled cross-section view of the food thermometer of FIG. 17A.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

This disclosure is directed to a smart food thermometer that can be positioned inside a heat chamber (e.g., grill, oven, etc.) or on a heat source.

One of the features is positioning electronic components that are sensitive to heat in a portion of the food thermometer that is inserted into the meat. The meat protects the sensitive electronic components from heat. The entire food thermometer can be positioned in the heat chamber, which advantageously eliminates the need for a wired connection to a device located on the exterior. The food thermometer includes a wireless thermal sensor and an antenna. The antenna communicates the sensed temperature data to a portable electronic device.

Figure 1:
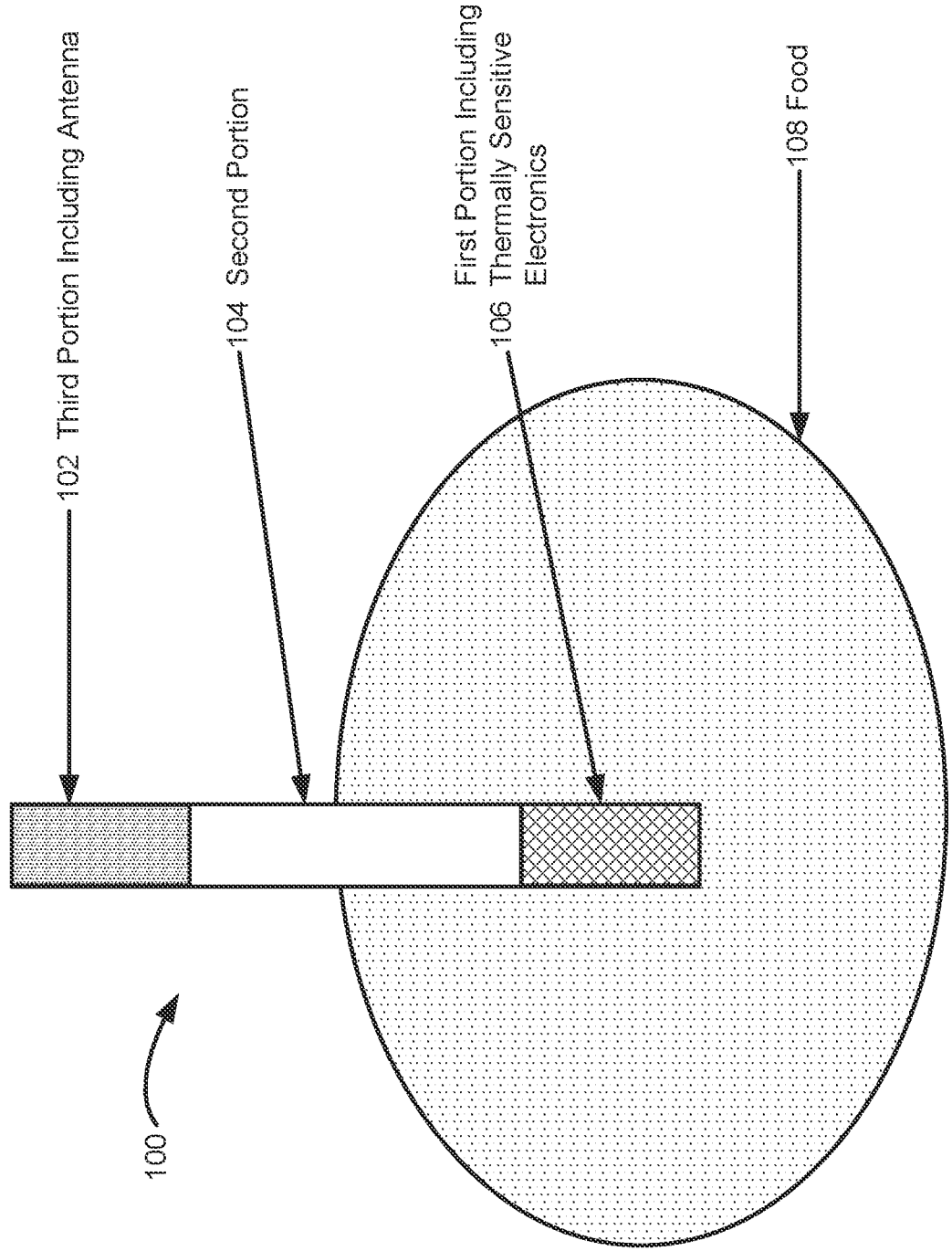
FIG. 1 illustrates a schematic diagram of a food thermometer according to an embodiment.

FIG. 1 illustrates a schematic diagram of a food thermometer 100 according to an embodiment. The thermometer 100 includes a first portion 106 having electronic components that are sensitive to heat. As shown in FIG. 1, the first portion is configured to be positioned in the food 108. A second portion 104 is connected to the first portion 106. In some implementations, the first portion 106 can include all of or part of a thermal sensor for detecting the temperature of the food 108. In other implementations, the thermal sensor for detecting the temperature of the food 108 can be located entirely or partially in a part of the second portion 104 that is inserted into the food 108.

A third portion 102 is connected to the second portion 104 and includes an antenna for wirelessly transmitting data based on the detected temperature of the food 108. In addition, some implementations may also include an ambient thermal sensor in the third portion 102 to detect an ambient temperature in the cooking vessel (e.g., oven or BBQ) that is close to the exterior surface of the food 108. In some examples, the food 108 is meat, but one of ordinary skill will appreciate that the thermometer 100 can be used with other types of food.

Figure 2A:
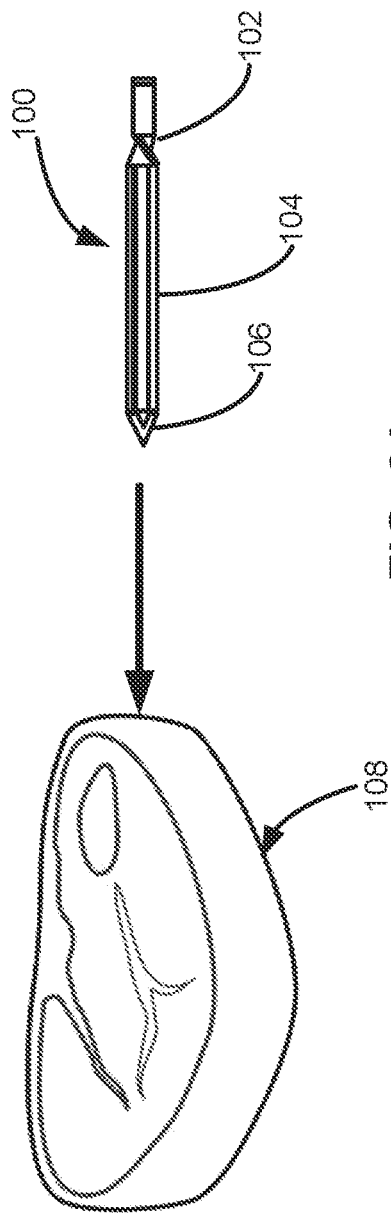
FIG. 2A shows the food thermometer of FIG. 1 being inserted in the direction denoted by the arrow into food according to an embodiment.
Figure 2B:
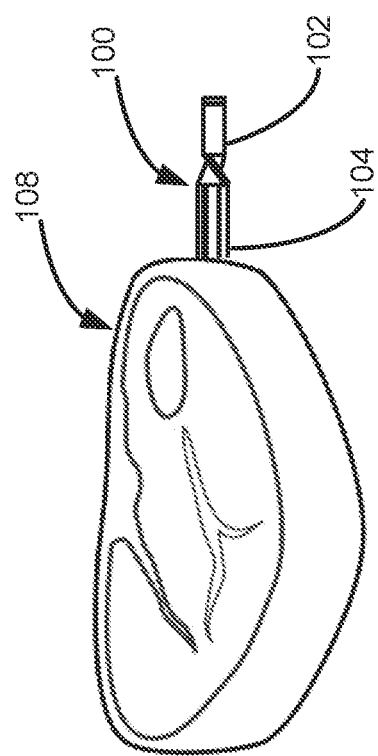
FIG. 2B shows the food thermometer of FIG. 2A after insertion into the food.

FIG. 2A shows the food thermometer 100 being inserted in the direction denoted by the arrow into the food 108. FIG. 2B shows the food thermometer 100 after insertion into the food 108. As shown in FIG. 2B, the third portion 102 remains outside of the food 108, but most of the second portion 104, and all of the first portion 106, are inside the food 108. In some implementations, the first portion 106 and the second portion 104 may not be separated from each other so that the first portion 106 and the second portion 104 correspond to portions of a continuous outer shell.

The lengths of the first portion 106 and the second portion 104 can be chosen so that the thermally sensitive electronics are fully inserted into a wide variety of types of food. In one example, the first portion 106 and the second portion 104 each take up about half the length of the thermometer 100 before reaching the third portion 102. The relative lengths of the first portion 106 and the second portion 104 can vary in other implementations to accommodate different food thicknesses or food types. In one example, the second portion 104 is arranged so that a thermal sensor in the second portion 104 is positioned to measure temperature across an area inside the food 108. In other examples, a thermal sensor for measuring a food temperature can be located in the first portion 106. In addition, the cross section of the thermometer 100 can be chosen to have a relatively small cross sectional area so as not to significantly disrupt the composure of the food 108.

As discussed in more detail below, including the thermally sensitive electronics in the first portion 106 ordinarily allows for protection of the thermally sensitive electronics by using the food 108 to insulate the thermally sensitive electronics from the full heat of the cooking vessel. Other less thermally sensitive electronics may be included in the second portion 104 or the first portion 106.

For example, the thermally sensitive electronics can include a solid-state battery such as a thin film lithium battery or other battery type that may begin to degrade in performance at temperatures greater than a temperature of food being cooked (e.g., over 100° C. for meat). The ambient temperature inside a cooking vessel, such as an oven or a BBQ, can often reach temperatures in excess of 230° C. However, even when the ambient temperature inside the cooking vessel is 230° C., the temperature inside of a food such as a steak may only reach 77° C. for a well-done steak due to the thermal mass of the food.

In this regard, the thermally sensitive electronics in the first portion 106 may include a thermal sensor for detecting the temperature of the food 108. As discussed in more detail below, the third portion 102 or an end of the second portion 104 opposite the first portion 106 can include an ambient thermal sensor that can withstand or better detect higher temperatures than the thermal sensor used to detect the temperature of the food 108. The thermal sensor used to detect the temperature of the food 108 in the first portion 106 and/or the second portion 104 can be a different type of sensor than the ambient thermal sensor used to detect the ambient temperature near the food 108. In another implementation, the ambient thermal sensor may include an infrared sensor located in the first portion 106 or the second portion 104 that receives infrared light radiated from a component in the third portion 102, such as the antenna or the handle, to indirectly measure an ambient temperature. A light guide may also be used to direct the infrared light from the third portion 102 to the infrared sensor.

The location of the third portion 102 allows for the antenna to be unaffected by attenuation or interference that may be caused by the food 108. In implementations where the third portion 102 includes an ambient thermal sensor, locating the ambient thermal sensor in the third portion 102 ordinarily allows for the detection of the ambient temperature inside the cooking vessel that is adjacent the exterior surface of the food 108. Although conventional ovens and BBQs typically provide an indication of a temperature inside the cooking vessel, the actual temperature near the food 108 can differ from the temperature at other locations in the cooking vessel. As discussed in more detail below, detecting the ambient temperature near an exterior surface of the food 108 (e.g., within two or three inches) can provide an improved temperature measurement. This improved temperature measurement near the exterior surface of the food 108 can be used to determine a thermal mass of the food 108, a more accurate completion time, a more accurate resting temperature rise, and/or better instructions for cooking the food 108 to achieve a desired result.

Figure 3A:
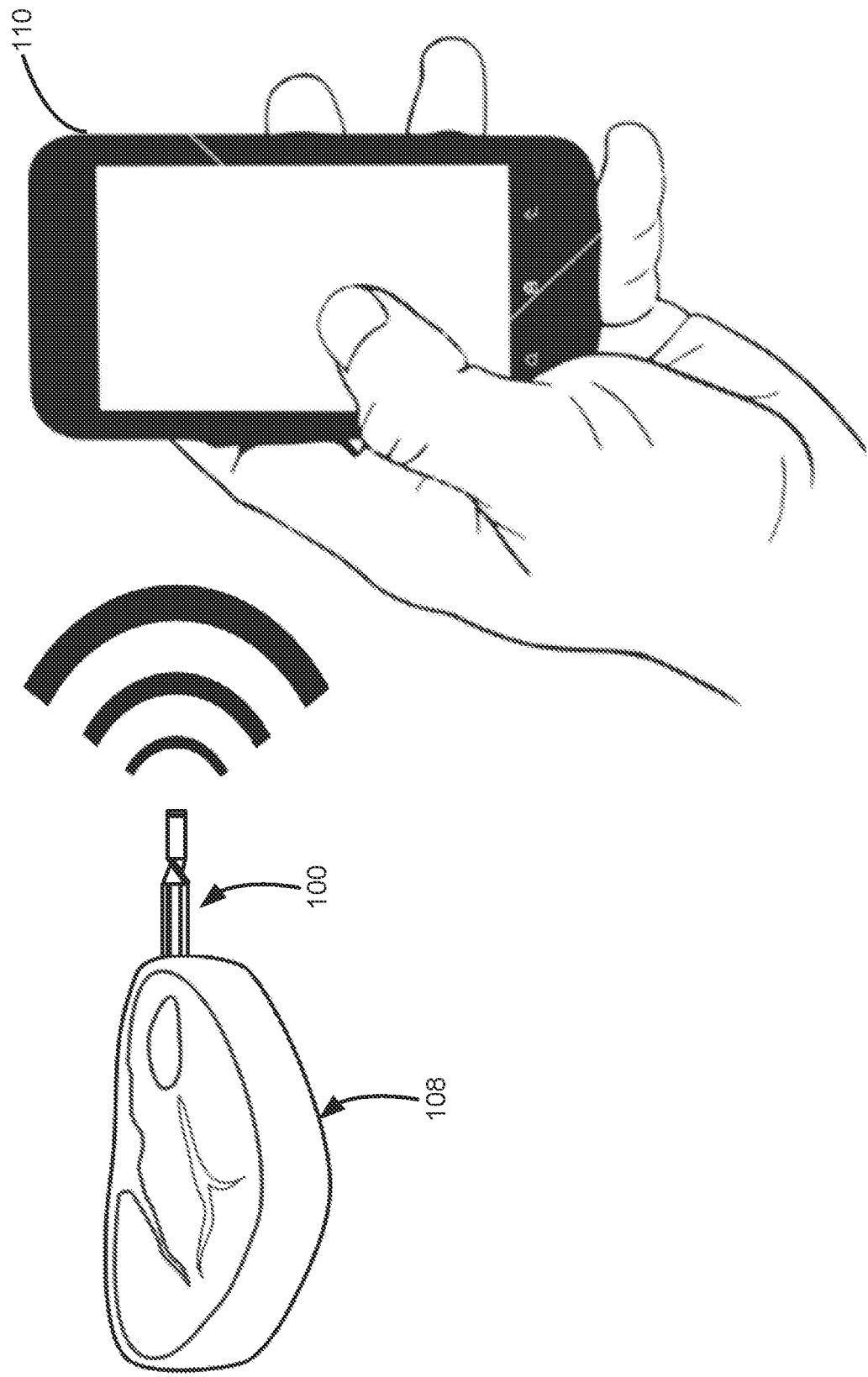
FIG. 3A shows wireless communications between the food thermometer and a portable electronic device according to an embodiment.

FIG. 3A shows wireless communications between the thermometer 100 and a portable electronic device 110. A unique advantage of the present invention is that the food 108 and thermometer 100 can be positioned inside a heating vessel (such as an oven), and the thermometer 100 can wirelessly communicate with a portable electronic device 110, without any wired connections and without any additional hardware that serves as a connection bridge between the thermometer 100 and the portable electronic device 110.

"Portable electronic device" as used herein refers to an electronic device having at least a processor, a memory, a display, and an antenna for enabling wireless communication. In one embodiment, the portable electronic device is a smartphone (such as an iPhone®) or a tablet computer (such as an iPad®). In other embodiments, the portable electronic device may be a smart watch or other types of smart devices with a processor and an antenna for communicating directly or indirectly with the thermometer.

Figure 3B:
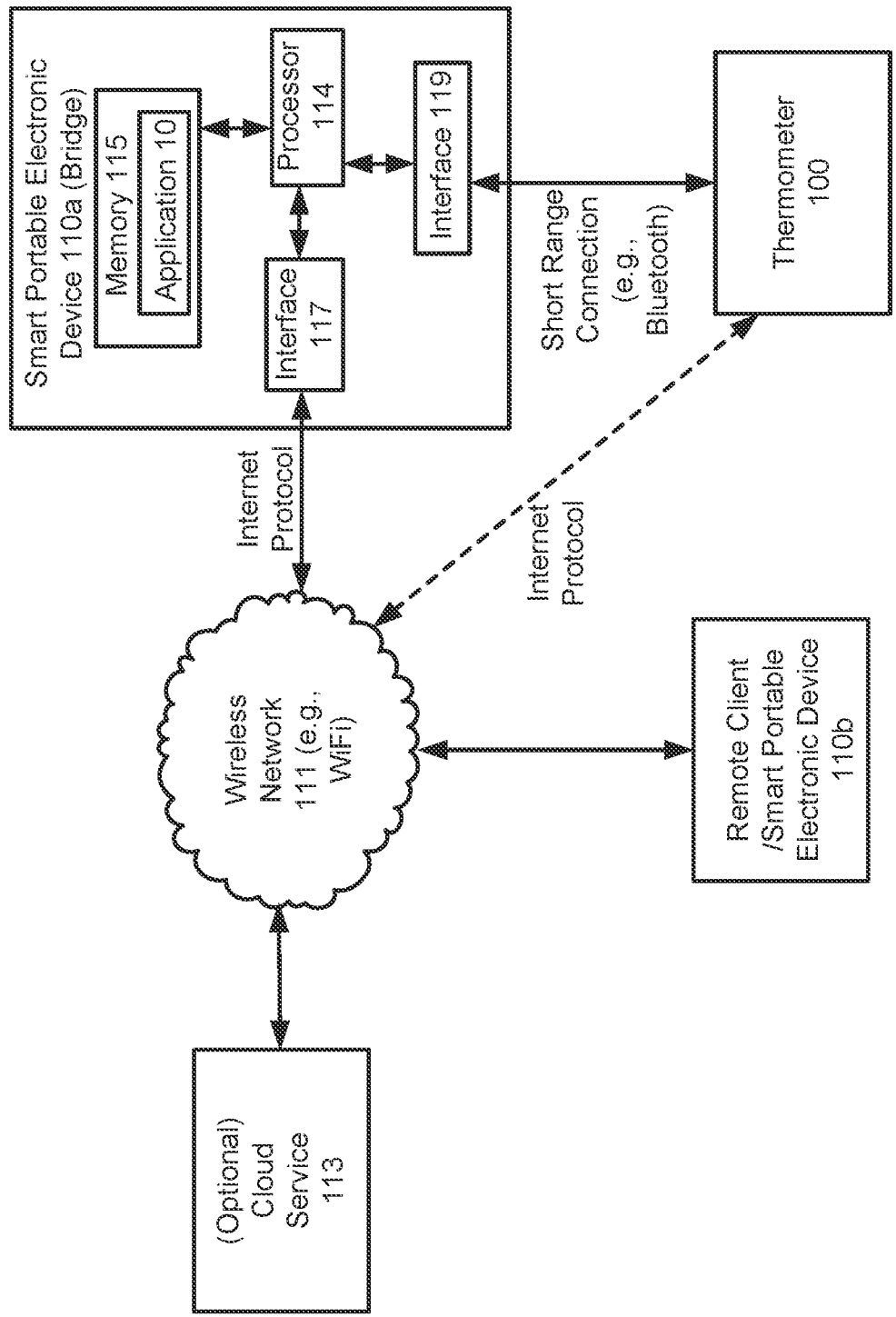
FIG. 3B is a system diagram showing wireless connections between the food thermometer of FIG. 3A and multiple portable electronic devices.

FIG. 3B is a system diagram showing wireless connections between the thermometer 100 and portable electronic devices 110 (e.g., 110a and 110b). In one implementation, there may be a direct connection to a smart portable electronic device 110a (e.g., a tablet, smartphone, laptop, etc.) using for example, a short range point to point communication protocol, such as a BLUETOOTH® connection. If only short range communication is utilized, then other users may be out of the wireless range, or have limited access when the user of the electronic device 110a is connected with the thermometer 100. In some implementations, the portable electronic device 110a can be used as a connection bridge to connect to more remote clients/smart portable electronic devices 110b via a wireless network 111 (e.g., a Wi-Fi connection).

Utilizing the smart portable electronic device 110a as a bridge is particularly advantageous in this application in which the thermometer 100 is positioned in a cooking vessel such as a BBQ or oven in part because such cooking vessels can reduce wireless network range. The smart portable electronic device 110a shares information received from the thermometer 100 with other smart devices (e.g., 110b) via the wireless network 111 (e.g., an Internet Protocol network such as Wi-Fi), thereby allowing other users/devices at a greater distance to monitor the cooking process. The connection between the thermometer 100 and the wireless network 111 is shown as dashed to indicate that there is a virtual connection between them. In such an implementation, the actual connection is between the thermometer 100 and the bridge device (e.g., smart portable electronic device 110a) via interface 119, and also between the bridge device and wireless network 111 via interface 117. For example, the bridging technology may be based on BLUETOOTH® 4.0 or BLUETOOTH® 4.2, which allows Internet Protocol connectivity (e.g., IPv6) via BLUETOOTH® 4.2 capable bridge devices to the local area network and the internet. The foregoing described connectivity is provided as an example. The bridge technology can enable other types of wireless connections based on design concerns and parameters.

Although in FIG. 3B, the bridge device is shown as a smart portable electronic device 110, the bridge device can alternatively be a physical bridge device such as the charging apparatus 700 discussed below with respect to FIGS. 9A and 9B. In such an implementation, the charging apparatus 700 can serve a dual purpose as a wireless connection bridge between the thermometer 100 and the wireless network 111 (similar to the bridge connectivity set forth above as to the smart portable electronic device 110a), and as a charging device when the user seeks to charge the thermometer 100.

It can be appreciated that the wireless network 111 may be a local area network and/or a wide area network such as the internet. In one implementation, the system utilizes a connection to the internet and a cloud-based service. The information transmitted by the thermometer 100 can optionally be shared via cloud service 113 instead of a more direct connection between two or more smart devices.

As shown in FIG. 3B, the electronic device 110a includes a processor 114 configured to execute application 10 for processing data provided by the thermometer 100 and presenting information to the user based on the processed data. Application 10 can include computer-executable instructions stored in a memory 115 of the electronic device 110a and accessed as needed by processor 114. Thermometer 100 sends data such as temperature measurements to an interface 119 of the electronic device 110a. The processor 114 processes the received data in accordance with execution of the application 10, and provides information using a user interface of the application 10 on one or more output devices (e.g., display and/or speaker) of the electronic device 110a. The processor 114 may also optionally send the processed data or data generated by executing the application 10 to the wireless network 111 via an interface 117.

The user interface of the electronic device 110a can, for example, display a current temperature of the food, a completion time prediction, or recommendations on how to cook the food 108 to achieve a result specified by the user such as a final doneness of the food 108 (e.g., medium or well-done). The cooking instructions can include, for example, adjustments to temperature, when to flip a piece of meat, when to sear the food, when to remove the food from heat, or how long to let the food rest after removing it from heat. Devices known in the art have not been able to accurately predict completion times, predict a resting temperature rise after removing the food from the cooking vessel, or provide accurate instructions on when to adjust the cooking temperature or perform another cooking action.

As noted above, more accurate predictions on completion time and resting temperature rise can ordinarily be made by utilizing dual-sensor technology. Using an ambient or external thermal sensor in or near the third portion 102 can enhance estimation of heat input at the location of the food 108, which can vary when the food 108 is moved, turned, or when changes in cooking environment occur, such as opening the hood of a BBQ, adjusting heat on a gas grill, or charcoal fuel losing heat. The heat input at the location of the food 108 can be estimated more accurately using an ambient or external thermal sensor adjacent an exterior surface of the food 108 and measuring the ambient temperature over a period of time.

In addition, the processor 114 can use application 10 to generate a heat response of the food 108 using a detected internal temperature in the second portion 104 over a period of time. The processor 114 can also use application 10 to determine a thermal mass of the food 108 using the measured internal temperature and the measured ambient temperature over time. In other implementations, the heat response and/or the thermal mass of the food 108 can be determined by the cloud service 113, the remote electronic device 110b, electronics of the thermometer 100, or combinations thereof.

In addition, the location of the ambient thermal sensor near the exterior surface of the food 108 ordinarily allows for an accurate determination of a thermal mass for the food 108. The thermal mass or heat capacity of the food 108 represents the ability of the food 108 to store heat and can affect how quickly the food 108 heats up or cools off. By using actual measurements (i.e., the internal temperature and the external temperature of the food 108), as opposed to a previously stored value for a given food, variations in composition from a typical composition (e.g., higher fat content, lower density) are accounted for in the thermal mass determined from the temperature measurements. As discussed in more detail below, a thermal mass determined from empirical data for the actual food being cooked ordinarily provides a more accurate determination of useful information such as a completion time, a resting temperature rise, or specific instructions on cooking the food 108, such as temperature adjustments during the cooking process.

Unlike conventional methods for estimating a completion time based only on an internal temperature or an external temperature, processor 114 executing application 10 can more accurately estimate a completion time based on a thermal mass of the food 108 by using the current internal temperature of the food 108, the ambient temperature adjacent the food 108, and time data. In other implementations, the estimation of a completion time can be performed by the cloud service 113, the remote electronic device 110b, electronics of the thermometer 100, or combinations thereof. Completion time estimates can be further refined by user input indicating, for example, a type of food being cooked, a weight of the food, or the type of preparation desired. In some implementations, the user input can be used to provide an initial estimate of the thermal mass and the completion time, which can be adjusted based on data received from thermometer 100 as the food 108 is being cooked.

The application 10 according to some implementations can advantageously estimate a resting temperature rise that can be accounted for in the completion time estimate or in cooking instructions provided to the user. Conventional cooking devices have not been able to account for a resting temperature rise of food in the cooking process. This can be due in part to a failure to accurately determine or consider a thermal mass of the food that is actually being cooked, rather than using a preset value for a certain food type.

Resting is the process during which the food is removed from the heat source and allowed to "rest" under normal ambient temperatures such as room temperature. During this resting period, the food temperature stabilizes and distributes more evenly within the food due to heat flowing from the warmer exterior of the food to its cooler interior. The resting temperature rise can be, for example, several degrees and can make the difference between a medium-rare or medium doneness in a steak. For most meats, the resting period also helps fluids redistribute more evenly within the meat. Resting temperature rise is a dynamic parameter that can depend upon several factors such as the thickness of the food, the thermal mass of the food, and the cooking temperature towards the end of the cooking cycle. Usually, the cooking temperature from the start of cooking has already had time to equalize, but the cooking temperature near the end of the cooking cycle will usually have more of an effect on the resting temperature rise.

Figure 4:
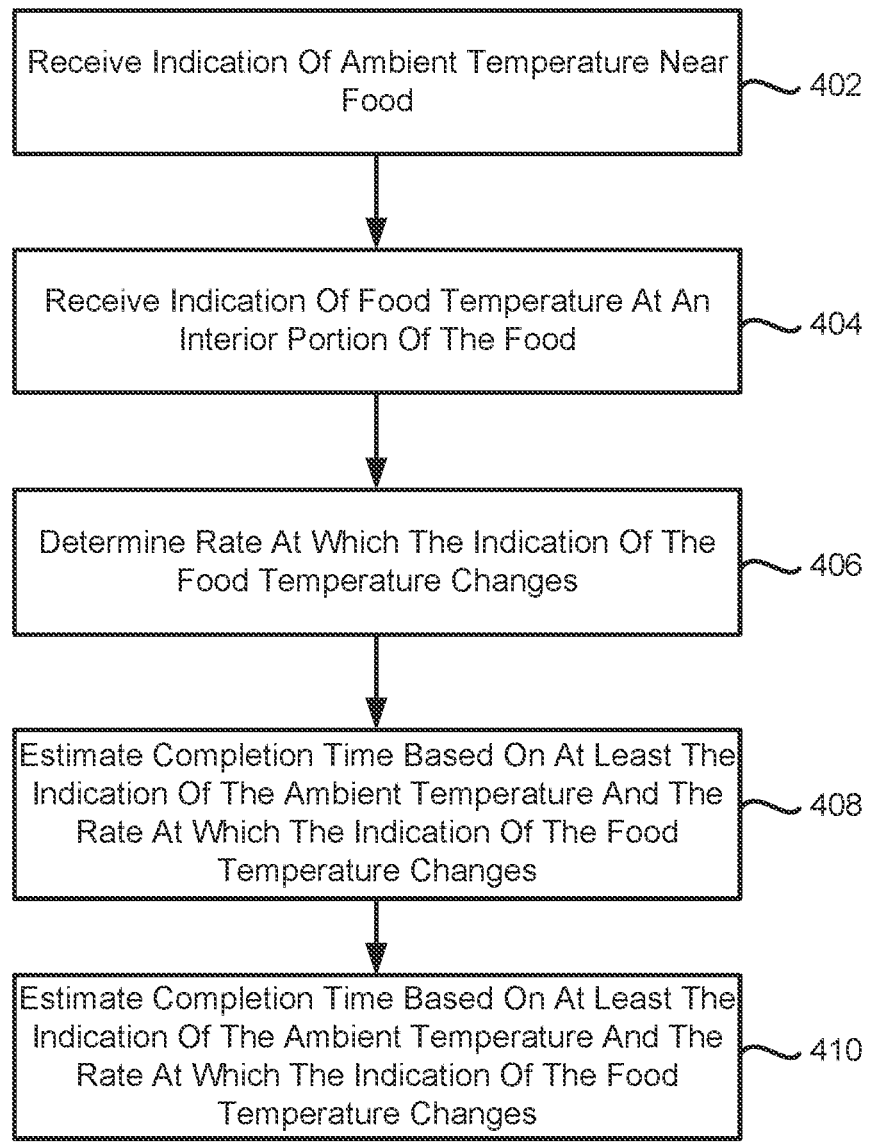
FIG. 4 is a flowchart for a completion time estimation process according to an embodiment.

FIG. 4 is a flowchart for an example completion time estimate process that can be partly or wholly performed by the processor 114 of a portable electronic device, a charging device in wireless communication with the food thermometer, or by the food thermometer itself. To enhance accurate prediction, the process of FIG. 4 considers both an ambient temperature and the temperature of the food. In some implementations, the process of FIG. 4 may also estimate a resting temperature or resting temperature rise to allow cooking to end at a lower temperature. This advantageously allows the resting temperature to rise to finish the cooking process throughout the food to a target temperature. In addition, the estimated resting temperature or resting temperature rise can take into account the thermal mass of the food in substantially real time.

The current heat being applied is determined by current or recent measurements of an ambient thermal sensor in the thermometer. In one implementation, only or primarily recently applied heat is taken into account as it has not yet progressed to internal parts of the meat. In this regard, the time parameters for the estimation can depend on the thermal mass of the food 108 being cooked. For example, the last three to five minutes of ambient heat can be averaged and used as input heat for a resting temperature rise prediction. The resting temperature rise prediction and/or an adjusted target temperature can be displayed to the user of the portable electronic device 110a to allow the user to end cooking.

As shown in FIG. 4, an indication of an ambient temperature near the food is received in block 402. The indication of the ambient temperature can be received by a remote device via a wireless signal transmitted from the thermometer. In another implementation, a processor in the electronics of the thermometer may receive the indication of the ambient temperature from an ambient sensor of the thermometer. The location of the ambient temperature measurement can be near to an exterior of the food, such as within three inches of the exterior of the food to provide a more accurate indication of the heating of the food.

In block 404, an indication is received of the food temperature at an interior portion of the food. With reference to the example of thermometer 100 discussed above, this indication can come from one or more thermal sensors located in the first portion 106 and/or the second portion 104. As with the indication of the ambient temperature, the indication of the food temperature may be received by a processor of the thermometer or by a remote device.

In block 406, the rate at which the indication of the food temperature changes is determined. In one implementation, this can include determining a temperature rise value based on an indication of the ambient temperature received in block 402. For example, an ambient temperature range can be used to select the temperature rise value, X. This can ordinarily allow for the ambient temperatures near the food 108 to be accounted for in determining the temperature rise value X.

In one implementation, the temperature rise value X is selected from different temperature rise values corresponding to different ambient temperature ranges and/or types of food. In such an example, a table of temperature rise values can be stored in memory 115 of device 110 for access by the processor 114. A user of the portable electronic device 110a, for example, may select a food type for the food from a plurality of food types (e.g., ribeye steak, sirloin steak, chicken), with the different food types being associated with different temperature rise values for the same ambient temperature value or range of ambient temperature values. The selection of a food type can ordinarily further customize the estimation of a completion time and/or a resting temperature rise.

In block 408, a completion time is estimated based on at least the indication of the ambient temperature and the rate at which the indication of the food temperature changes. In this regard, a thermal mass or thermal conductivity of the food is considered by using the rate at which the indication of the food temperature changes, and the heat applied to the food is also considered through the indication of the ambient temperature.

In one implementation, an amount of time is measured for the indication of the food temperature to increase by a temperature rise value X as discussed above with reference to block 406. This measurement may be performed by a processor of the thermometer monitoring a signal from the thermal sensor. In other implementations, the thermometer may transmit values for the temperature signal to a remote device that measures the time for the indication of the temperature to increase by the temperature rise value.

The completion time may include estimating a resting temperature rise for an amount of temperature rise in the food after the food will be removed from heat. As discussed in more detail below, a thermal value of the food can be determined based on at least the temperature rise value and at least one of a food type of the food and an initial amount of time for the indication of the food temperature to increase by the temperature rise value during an initial period of cooking. The thermal value for the food is then used to estimate the resting temperature rise. In such an example, the thermal value represents a thermal conductivity or thermal mass of the food. This allows for the ability of the food to heat up to be considered when estimating a completion time or a resting temperature rise.

For example, a time t1 can be measured from the beginning of cooking until the temperature of the food 108 rises by a temperature rise value X during an initial portion of the cooking process. A second time t2 can be measured for the temperature of the food 108 to rise by the value X during a middle or more steady-state portion of the cooking process that follows the initial portion of the cooking process. A thermal value k can be calculated based on the temperature rise during the middle portion of cooking using Equation 1 below.

$$k = X/t2 \qquad \text{Equation 1}$$

The resting temperature rise can be calculated using Equation 2 below.

$$\Delta T_{rest} = k(t1 - t2) \qquad \text{Equation 2}$$

As an example, if it takes ten minutes for the temperature of food 108 to rise by 10° during the initial portion of cooking, and it takes five minutes for the temperature of food 108 to rise by 10° during the middle portion of cooking, the thermal value is 2°/min using Equation 1 above. The resting temperature rise is then calculated as 10° using Equation 2 (i.e., 2×(10 min−5 min)). Other implementations may use a different calculation to account for the thermal mass or conductivity of the food 108 in predicting a resting temperature rise.

In situations where thermometer 100 includes an ambient thermal sensor, the ambient thermal sensor may be used to more accurately detect a cooking start time by detecting when the ambient temperature rises faster than a threshold value, such as a temperature increase of 5° C. This detection can be used in the example above to trigger the measurement for t1. In other implementations, the detection of the beginning of cooking can begin with a relatively small (e.g., 1° C.), but sudden temperature change indicating the insertion of the thermometer into the food 108. In another implementation, the beginning of cooking can be detected by the first temperature rise of the food 108 that is measured by the thermometer 100. In yet another implementation, a user may indicate the start of cooking using a portable device, such as with a user interface executed by device 110a in FIG. 3B.

In some implementations, device 110a or another device calculating a resting temperature rise may use readings from the ambient sensor to consider changes in the cooking temperature during the cooking process. In one such implementation, an average of recent ambient temperatures is used to calculate an adjusted resting temperature rise as shown below in Equation 3.

$$\Delta T_{restadj} = \Delta T_{rest}(T_{amb}/T_{ambstart}) \qquad \text{Equation 3}$$

A completion time can be estimated using the thermal value of the food. In one implementation, a remaining temperature rise is calculated by subtracting a current temperature for the food and the adjusted resting temperature rise from a target temperature as shown below in Equation 4.

$$\Delta T_{remaining} = T_{target} - (T_{current} + \Delta T_{restadj}) \qquad \text{Equation 4}$$

The estimated completion time can then be estimated by dividing a recent thermal value by the remaining temperature rise calculated from Equation 4 above. This implementation for calculating the estimated completion time or estimated remaining time is expressed below in Equation 5.

$$t_{remaining} = k_{recent}/\Delta T_{remaining} \qquad \text{Equation 5}$$

The recent thermal value $k_{recent}$ can be calculated in a similar manner as the thermal value k discussed above.

The blocks discussed above may be repeated at various times throughout a cooking process to provide updated estimates on the completion time.

Some implementations can advantageously take into account the cooking process and make real time recommendations as to cooking completion time and temperature. A cooking process for meat often includes separate stages such as sear, cook, and rest. During the searing stage, high heat is applied to the meat to achieve surface crust texture, color, and flavor. During the cooking stage, the heat is applied to the meat until internal temperature reaches desired doneness or internal temperature. During the resting stage, the meat is removed from heat and the internal temperature rises as heat between the surface of the meat and its internal parts equalizes.

With reference to block 410 of FIG. 4, at least one recommendation is provided via a user interface based on at least one of the indication of the ambient temperature and the estimated completion time. For example, recommendations may be provided to a user in real time regarding what time and temperature to move to the next stage of cooking. The cooking process can include a traditional progression of sear, cook, and rest, or a reverse sear progression (i.e., cook, sear, rest), or a progression of cook, rest, and sear. The estimates for time and temperature, can be based on the same thermal mass and heat application considerations discussed above. According to the foregoing aspects, separate temperature and time estimates can be provided for different stages of cooking to allow for separate estimates during each stage.

In addition, the stage of cooking during a cooking process of the food can be determined by using the ambient temperature detected by an ambient thermal sensor in the thermometer. For example, a relatively low ambient temperature can correspond to a resting stage, a relatively higher range of ambient temperature can correspond to a cooking stage, and an even higher ambient temperature range can correspond to a searing stage. Using the ambient thermal sensor, cooking stages can be automatically detected by the thermometer or a portable electronic device without additional user input. Alternatively, other implementations can allow for user input to indicate a particular cooking stage.

Figure 5:
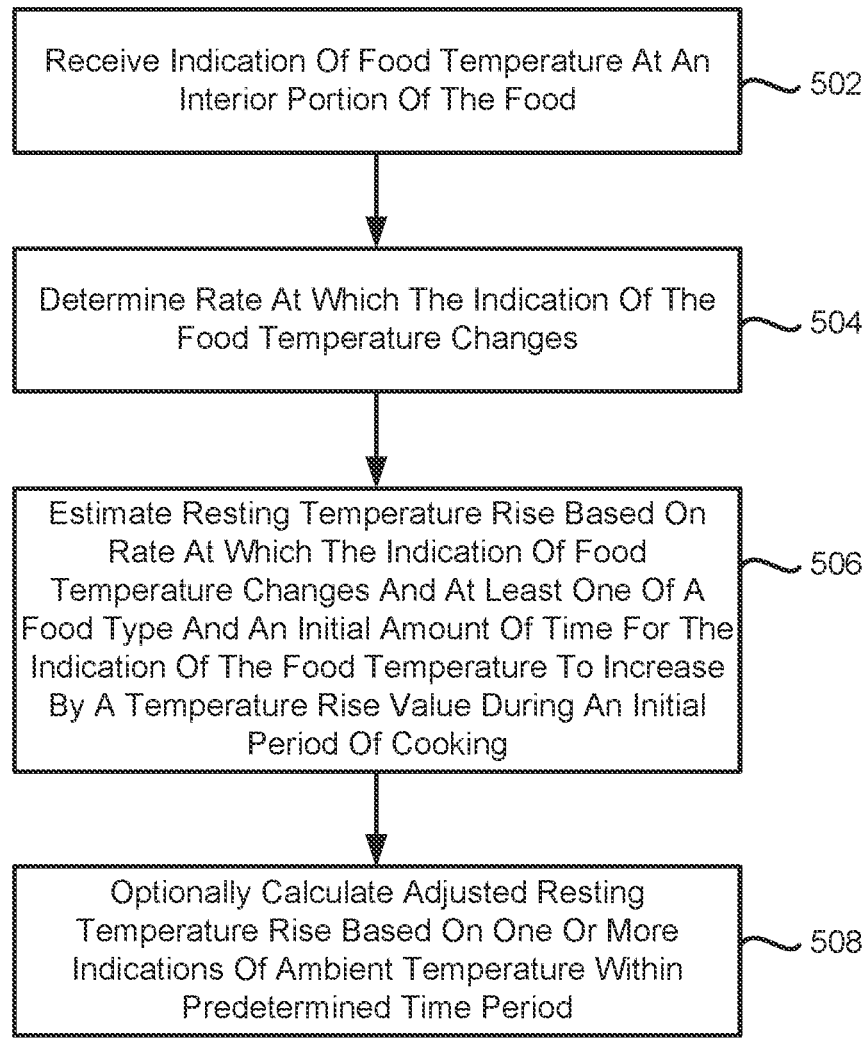
FIG. 5 is a flowchart for a resting temperature rise estimation process according to an embodiment.

FIG. 5 is a flowchart for an example resting temperature rise estimation process that can be partly or wholly performed by the processor 114 of a portable electronic device, a charging device in wireless communication with the food thermometer, or by the food thermometer itself. The resting temperature rise estimation process of FIG. 5 can be performed as a sub-process of a completion time estimation process as in FIG. 4 or as part of its own process or another process.

The description for blocks 502 and 504 can be understood with reference to the description above for blocks 404 and 406 of FIG. 4, so a description for these blocks is not repeated here. In block 506, a resting temperature rise is estimated based on the rate at which the indication of the food temperature changes. In addition, block 506 considers at least one of a food type and an initial amount of time for the indication of the food temperature to increase by a temperature rise value during an initial period of cooking. In one example, a food type (e.g., ribeye steak, chicken, brisket) may be selected by a user via a user interface. The food type can then indicate a thermal mass of the food that can be used with the rate determined in block 504 to estimate a resting temperature rise for the food.

Other implementations may consider an initial amount of time for the indication of the food temperature to increase by a temperature rise value. The initial amount of time can be used with a thermal value as discussed above with reference to Equation 2 to calculate a resting temperature rise.

In block 508, an adjusted resting temperature rise can be calculated based on one or more indications of an ambient temperature within a predetermined time period. In one example, an average of recent ambient temperature values can increase or decrease the resting temperature rise estimated in block 506. In yet another example, a current ambient temperature value can increase or decrease the resting temperature rise estimated in block 506. For example, the current ambient temperature value may be compared to a reference ambient temperature value, such as an ambient temperature value at the start of cooking. This comparison can provide an estimate of the heat applied to the food, which can be used to adjust the resting temperature rise.

Figure 6:
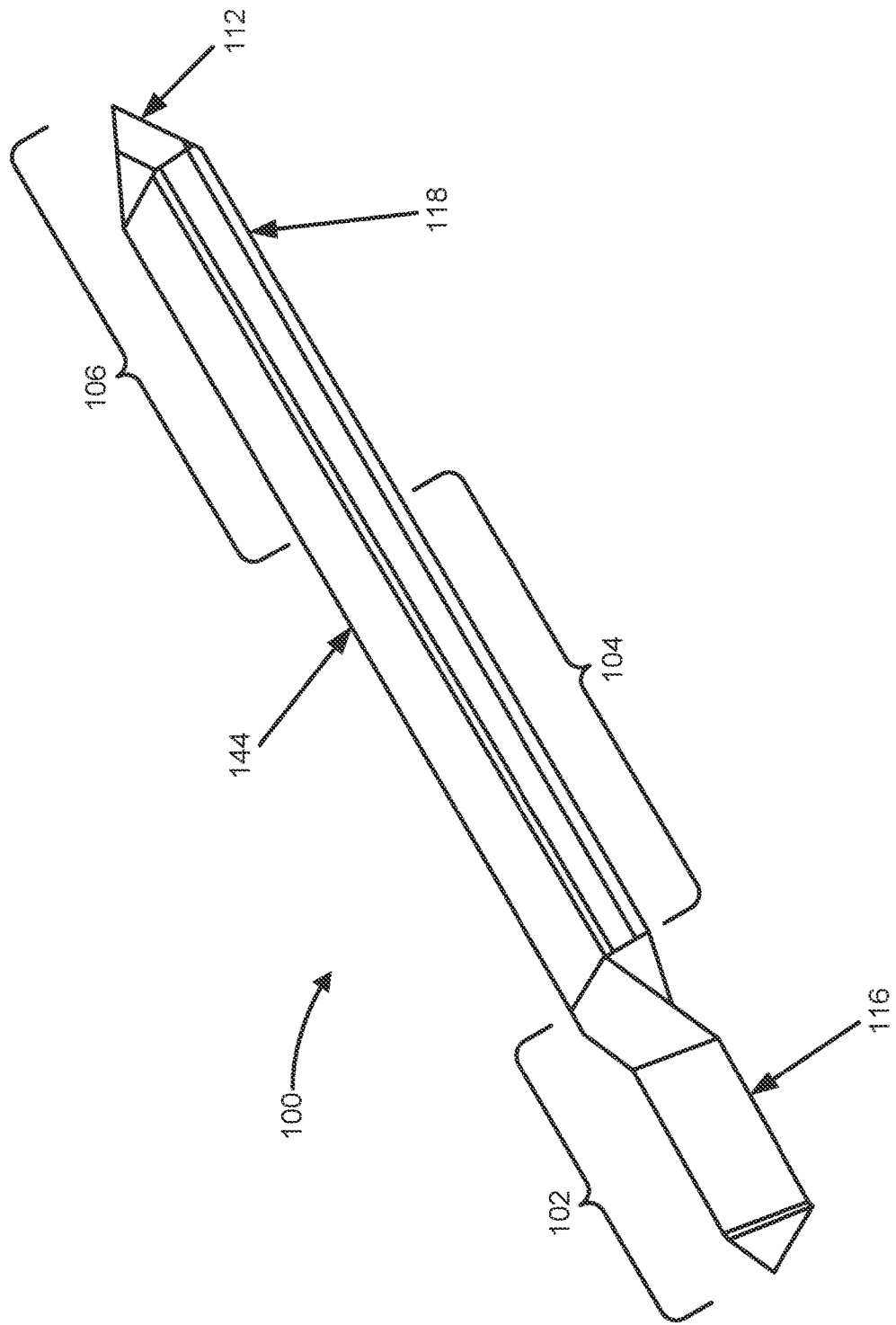
FIG. 6 shows an isometric view of a food thermometer according to an embodiment.

FIG. 6 shows an isometric view of the thermometer 100 according to an embodiment. The third portion 102 includes an ambient thermal sensor and an antenna. The handle 116 can be held by a user to insert or remove the thermometer 100 into or out of the food 108. The handle or hilt 116 can include a material for heat resistance and safer handling of the thermometer after heating. In some implementations, the hilt 116 can include an electrically insulating material that can withstand the high temperatures of a cooking environment. For example, the material of the hilt 116 can include alumina, zirconia, ceramic porcelain, glass, or a high temperature plastic for relatively lower cooking temperature applications.

The first portion 106 includes electronics that are sensitive to heat. The heat sensitive electronics of the first portion 106 are positioned close to a tip portion 112 of the thermometer to ordinarily allow for the greatest amount of insulation from the food 108 in protecting the heat sensitive electronics from high temperatures. The probe shaft 144 may include an exterior blade 118 made of stainless steel or another stainless material to allow for easier insertion of the thermometer 100 into the food 108.

As discussed above, the third portion 102 can include an ambient thermal sensor to measure the ambient temperature near the food 108. The third portion 102 can also include an antenna for establishing wireless communication with a portable electronic device such as electronic device 110 in FIG. 3A.

Figure 7:
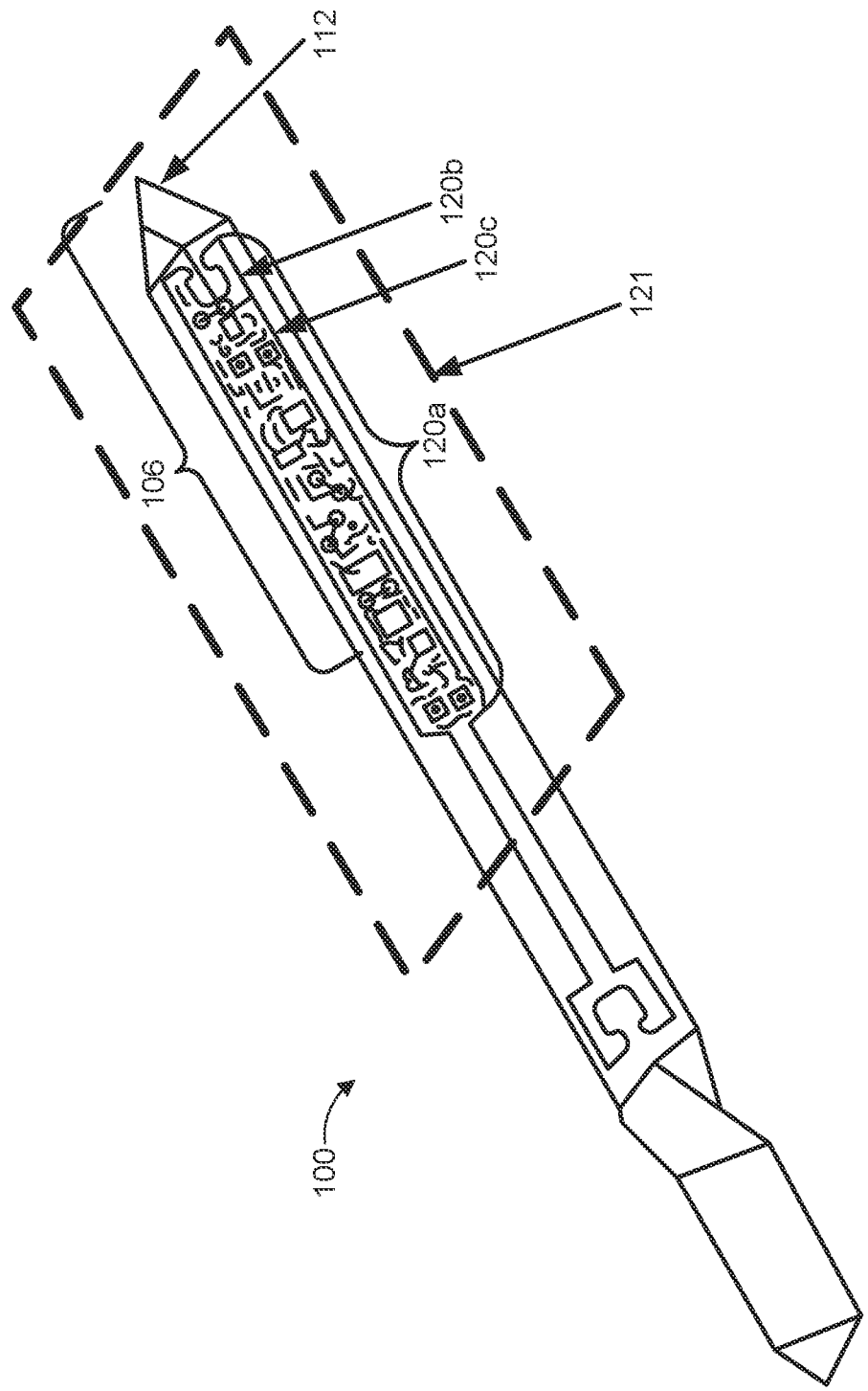
FIG. 7 is a view of the food thermometer of FIG. 6 showing internal components according to an embodiment.

FIG. 7 is an internal view of the thermometer 100 showing internal components encompassed by the probe shaft 144. Box 121 is shown for illustration purposes to roughly delineate parts of the thermometer 100 that are usually positioned inside the food 108. As shown in FIG. 7, box 121 includes the printed circuit board (PCB) 120a, battery 120b, and other electronic components 120c that are sensitive to heat. In this regard, battery 120b and electronic components 120c are located closer to the tip portion 112 than electronics on PCB 120a that are less sensitive to heat so that the battery 120b and the electronic components 120c are better insulated by the food 108. In other implementations, all of the electronics of thermometer 100 may be located in the first portion 106.

Figure 8:
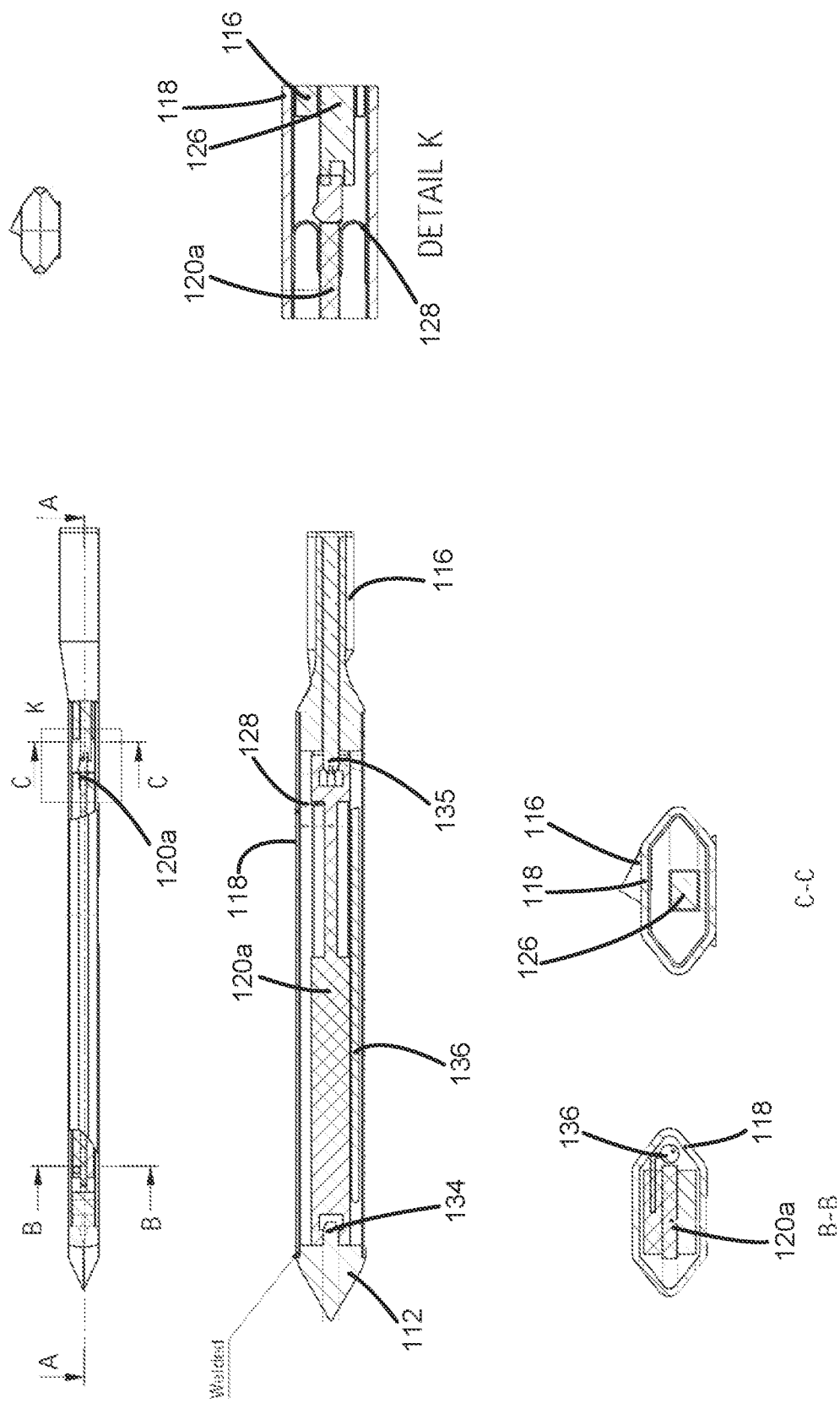
FIG. 8 illustrates various components of a food thermometer according to an embodiment.

FIG. 8 further illustrates an example arrangement of various components in the food thermometer 100 according to an embodiment. A person of ordinary skill in the art will appreciate that the relative proportions shown in FIG. 8 and example materials discussed below can differ in different implementations.

As shown in FIG. 8, the thermometer 100 includes a thermal sensor 136 inside the second portion 104 of the thermometer 100 that is in electrical communication with the electronics 120a. The thermal sensor 136 is located within the thermometer 100 to detect a temperature of the food 108. In the example of FIG. 8, the thermal sensor 136 includes a thermocouple wire that extends along a length of a portion of the thermometer 100 to provide a temperature measurement across a portion of the food 108. In other implementations, the thermal sensor 136 can include other types of thermal sensors such as a Resistance Temperature Detector (RTD), one or more thermistors, or an infrared sensor.

A ground spring 128 serves to help ground the electronics 120a to the exterior or blade of the thermometer 100. In some implementations, the exterior or blade 118 of the thermometer 100 can include a ferritic stainless steel. The tip 112 can similarly be made of a ferritic stainless steel. The electronics 120a are attached to the tip 112 and the antenna 126 with a push fit at each of locations 134 and 135, respectively.

The antenna 126 is positioned in the third portion 102 and can include a metal material such as stainless steel, a copper material, or a copper alloy with nickel that is in electronic communication with the electronics 120a. In the implementation shown in FIG. 8, the antenna 126 is a quarter wave monopole antenna. In other implementations, the antenna 126 can be a half wave dipole. The dimensions and shape of the antenna 126 can vary based on the RF technology being used. In the case where the antenna 126 is a quarter wave monopole, an effective length of the antenna 126 is approximately a quarter of the wavelength used at a particular frequency. For example, when using a frequency of 2.4 GHz, the effective length of the antenna would be 27 mm. The effective length of the antenna 126 may take into consideration a folding of the antenna to decrease the space consumed by the antenna 126 in the thermometer 100. The length of the middle portion of the thermometer 100 is sized to be at least twice the length of the antenna 126 when using a quarter length monopole.

In the example of FIG. 8, the tip 112 can be welded to the blade 118 and a silicon based flexible glue can be used to affix the electronics 120a and the antenna 126 to the exterior structure of the thermometer 100 near the hilt 116.

In other implementations, an interference fit attaches the electronics 120a and/or the antenna 126 to the exterior structure of the thermometer 100. The interference fit may include, for example, using a tight fitting metal gasket or an arrangement where an internal surface of the exterior structure fits over a surface of the electronics 120a or a surface of the antenna 126. Using an interference fit generally shortens an assembly time since there is no need for a glue to cure and can provide improved waterproofing and high temperature durability as compared to most adhesives. The use of an interference fit can also eliminate perceived food safety concerns associated with the adhesive escaping from the interior of the thermometer 100.

FIG. 9A shows a charging apparatus 700 for charging the battery 120b of the thermometer 100 according to an embodiment. FIG. 9B shows the thermometer 100 removed from the charging apparatus 700. In this state, the thermometer 100 is automatically set to an ON state.

In some implementations, the thermometer 100 is automatically set to an off state or low power state when positioned in the receptacle of the charging apparatus 700 to conserve power when the thermometer 100 is not in use. During the off state or the low power state, certain portions of the electronics 120a may be powered off that do not relate to charging the battery 120b or detecting a charging state of the thermometer 100.

Similarly, the thermometer 100 can be automatically activated or turned on when the thermometer is no longer in contact with the charging apparatus 700. When activated, the thermometer 100 may attempt to pair with a portable device such as portable device 110a or otherwise attempt to wirelessly communicate. In addition, circuitry for measuring the temperature of the thermal sensor 136 and an ambient temperature may also be powered. Thermometer 100 may detect that it is no longer in contact with the charging apparatus 700 via a contact of the thermometer 100 being no longer in contact with charging apparatus 700 or when charging of the thermometer 100 stops. In this regard, some implementations may include charging of the thermometer 100 through a direct contact with the charging apparatus 700, while other implementations may charge using inductive charging.

The automatic activation of the thermometer 100 using a voltage supplied by the charging apparatus 700 can ordinarily reduce the need for additional components such as an external button or switch to activate or wake the thermometer 100 from the low power or deactivated mode. Such an external button or switch on the thermometer 100 can complicate the manufacture and increase the cost of the thermometer due to waterproofing, sealing, or high heat design specifications.

In the example of FIGS. 8A and 8B, a BLUETOOTH® button 122 is provided for allowing the charging apparatus 700 to wirelessly communicate with a portable electronic device to indicate a status of charging. The charging status indicator 124 (e.g., an LED) is also provided to indicate the charging status. If the thermometer 100 has less than a certain threshold of power (e.g., 95% state of charge), the charging apparatus 700 will automatically charge it to full power.

As noted above, the charging apparatus 700 may also serve as a wireless connection bridge between the thermometer 100 and a wireless network (e.g., wireless network 111 in FIG. 3A). The charging apparatus 700 may also include an interface for connecting to the wireless network.

In addition, other embodiments may include a display on the charging apparatus 700 to provide temperature information received from the thermometer 100 when it is in use. In this regard, the charging apparatus can include an interface for communicating with the thermometer 100. In some embodiments, the charging apparatus 700 can include the processor 114 and the memory 115 discussed above for electronic device 110a in FIG. 3B. In such embodiments, the charging device 700 can execute the application 10 to process temperature data received from thermometer 100 and generate information based on the received temperature data, such as the thermal mass of the food 108, the completion time, the resting temperature rise, or specific cooking instructions. An indication of some or all of this generated information may be output on an output device of the charging apparatus 700, such as a display or on a speaker.

Figure 10A:
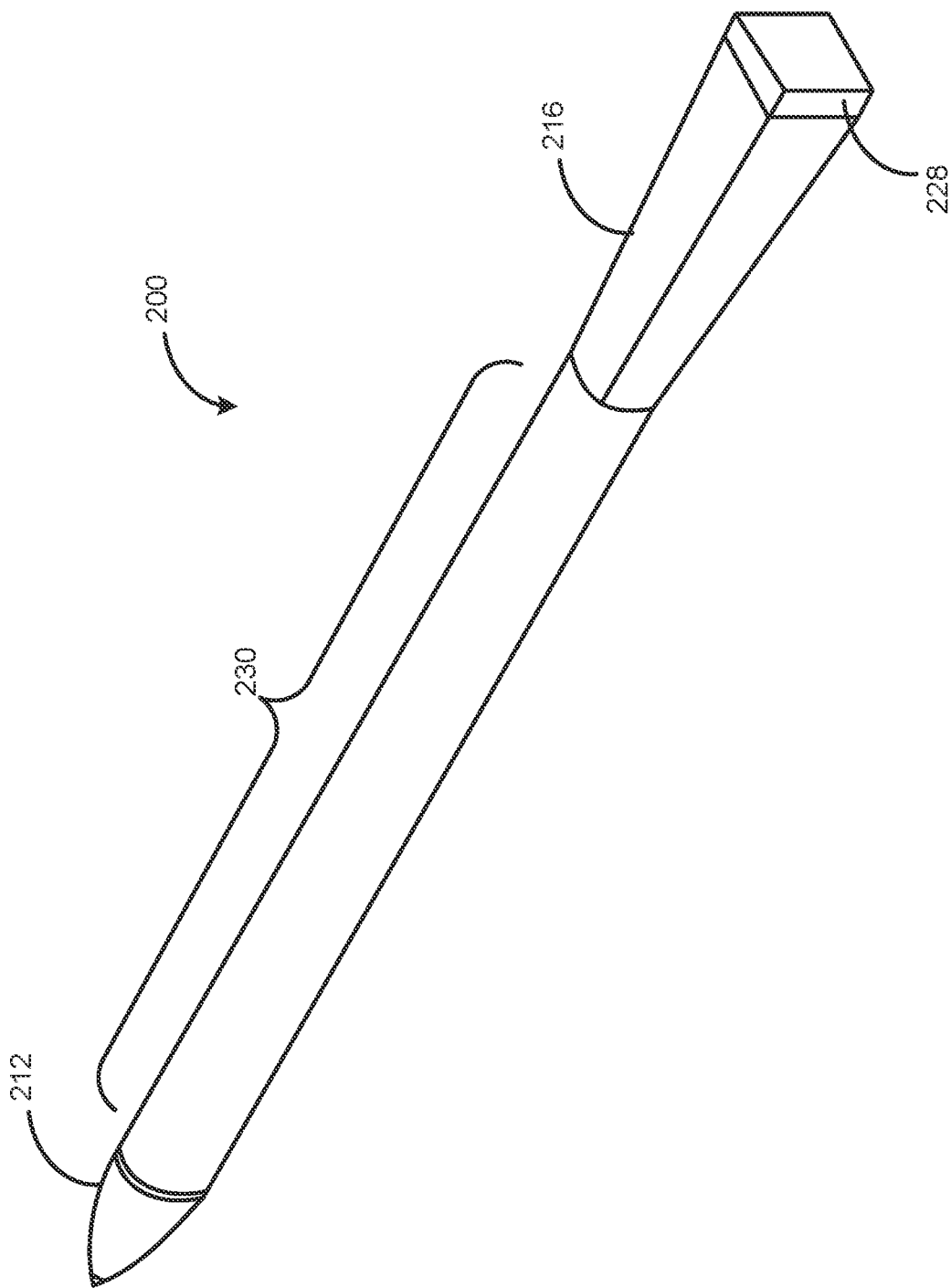
FIG. 10A shows an exterior view of a food thermometer according to an embodiment.

FIG. 10A shows an exterior view of another embodiment of a thermometer 200. The like numbers in the 200's range refer to similar components discussed above in the 100's range for the thermometer 100. The thermometer 200 includes a cylindrical pipe portion 230 located between a tip portion 212 and a handle 216 in an antenna region 202 corresponding to the third portion 102 of the thermometer 100 discussed above. At the distal end, a cap 228 is connected to the handle 216. Certain differences in shape between the thermometer 200 and the thermometer 100 such as the cylindrical shape of the pipe 230 or the shape of the cap 228 can be related to design considerations, such as aesthetics, lower manufacturing costs, durability or ease of use.

Figure 10B:
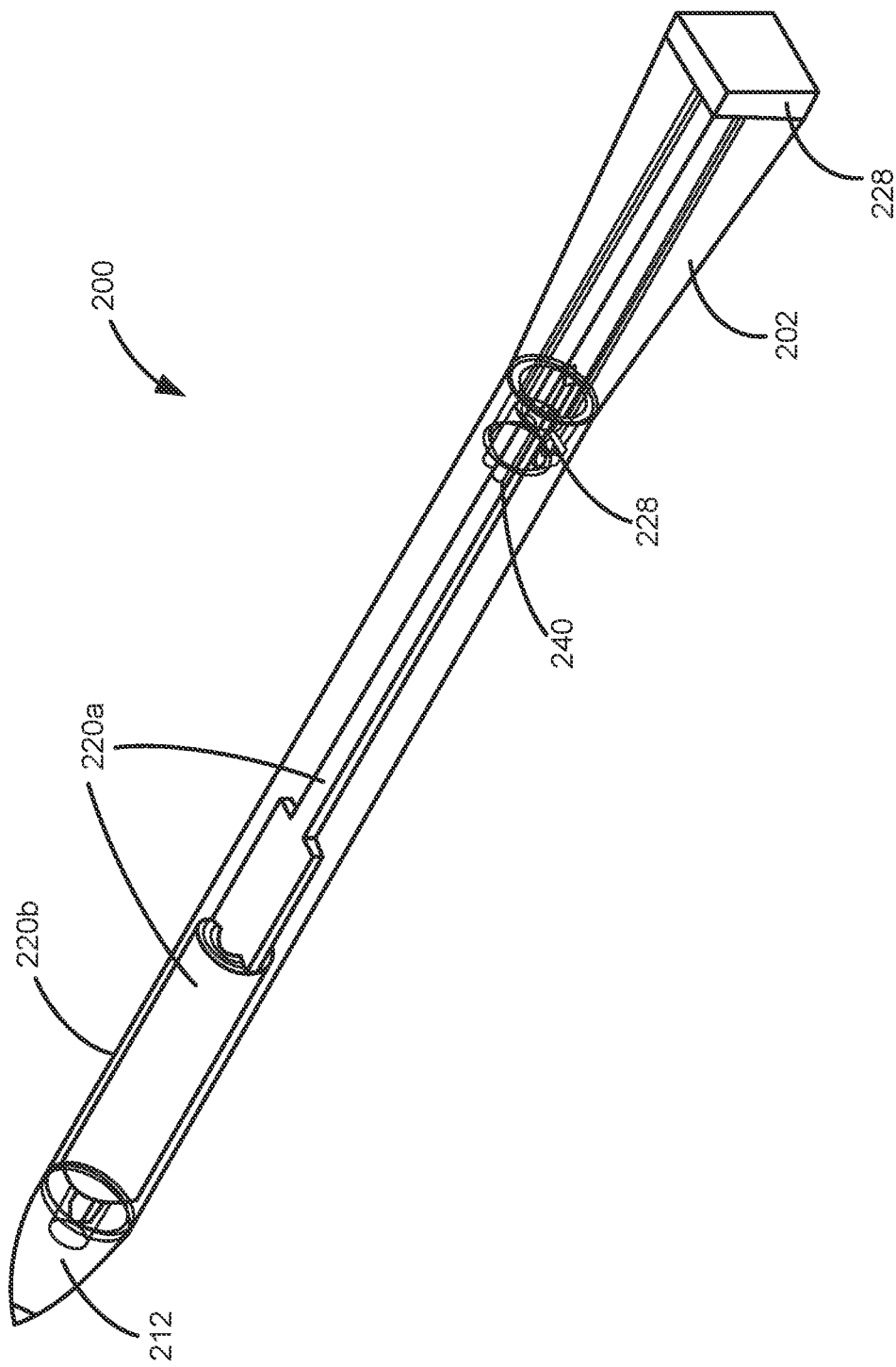
FIG. 10B shows internal components of the food thermometer of FIG. 10A according to an embodiment.
Figure 10C:
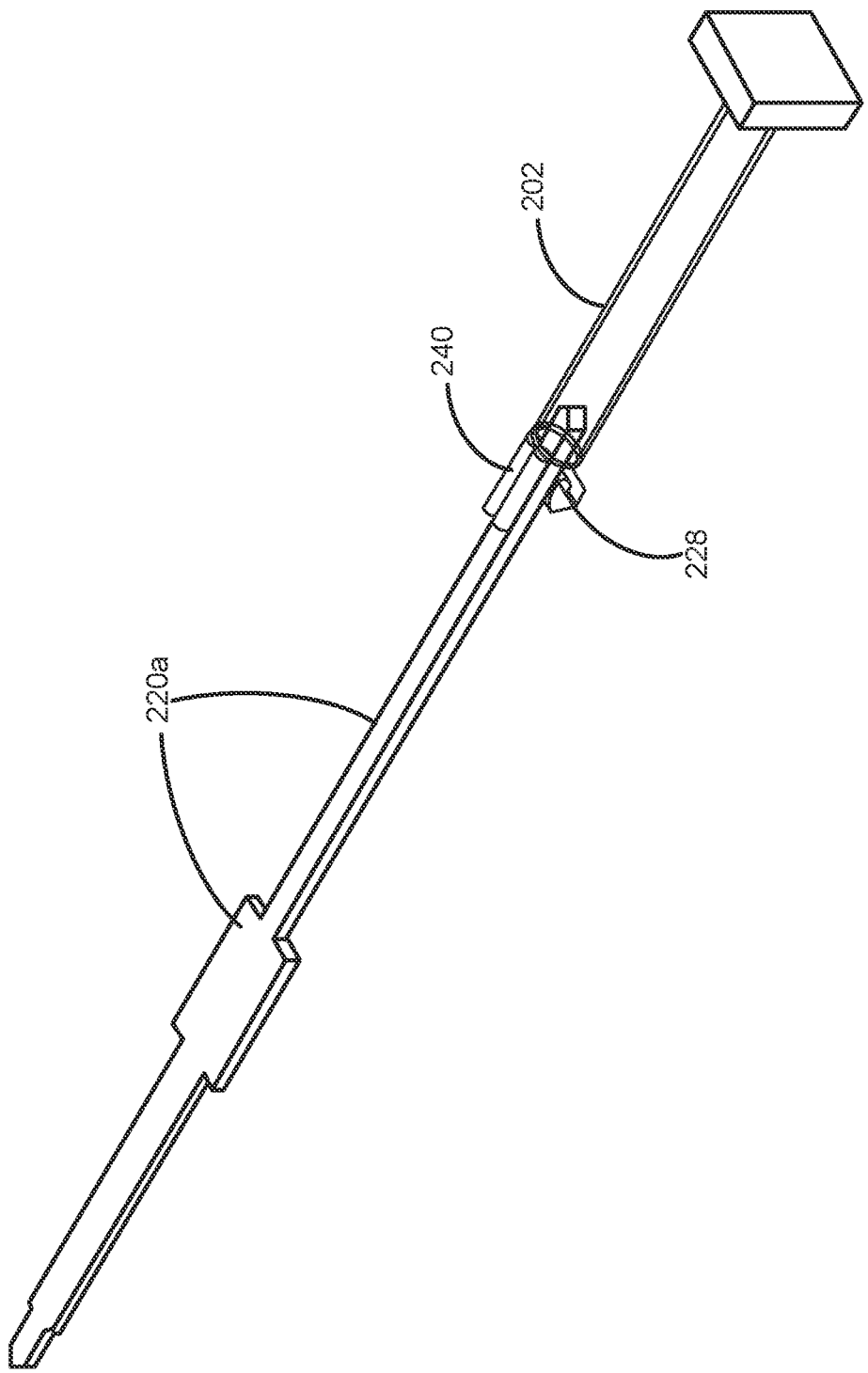
FIG. 10C further shows internal components of the food thermometer of FIG. 10B.
Figure 10D:
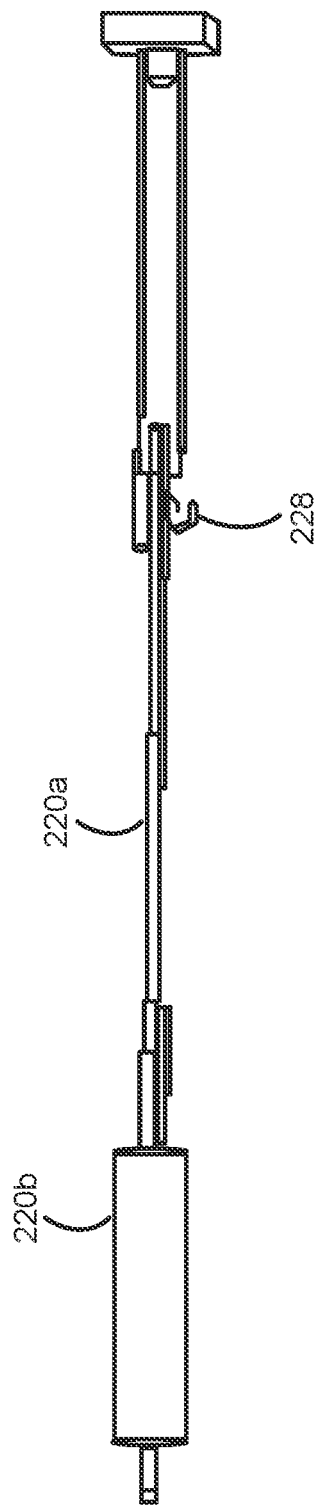
FIG. 10D is an internal side view of internal components of the food thermometer of FIG. 10B.

FIG. 10B shows a transparent view of the thermometer 200. A battery 220b is shown positioned around the PCB 220a contacts. Spring 228 provides an electrical ground contact for the electronics of the thermometer 200. As shown in FIG. 10B, the PCB 220a extends from the tip portion 212 through the pipe portion 230 and to the antenna region 202. However, the electronics that are sensitive to heat are located on the PCB 220a closer to the tip portion 212 than to the antenna region 202. Other electronics that are not as sensitive to heat can be located closer toward the antenna region 202. The temperature pair 240 provides ambient temperature measurement near an exterior of the food. FIG. 10C shows the PCB 220a, the temp pair 240, and grounding spring 228 in isolation to illustrate their exemplary structures. FIG. 10D is an internal side view of the thermometer 200.

As shown in FIG. 10D, the battery 220b is positioned near the tip portion 212 to allow the food to insulate the battery 220b from high temperatures. One of the advantages of this arrangement is utilizing the battery structure and positioning it in a manner to allow the battery to operate despite high temperatures in a cooking vessel that may otherwise degrade performance. Traditional electrolyte batteries for thermometers as known in the art may fail to operate under high temperature conditions due to a lack of high temperature tolerance and/or high temperature insulation. Due to the insulation provided by the food 108, the battery 220b can ordinarily have a lower operating temperature limit corresponding to a maximum food cooking temperature plus a factor of safety (e.g., 100° C. for meat).

In addition, the battery 220b in some implementations can include a solid-state battery that tolerates a relatively higher temperature, such as a thin film lithium battery that can tolerate up to 170° C. before performance degrades. In such an implementation, the battery 220b would also not include volatile solvents or liquid state chemicals that may further eliminate potential food safety concerns.

As set forth above, the thermometer 200 also advantageously utilizes ambient thermal sensing. Temperature measurement of a cooking vessel or ambient heat can be taken near the food being cooked to enhance the accuracy of temperature measurement since heat can vary from one location to another within a cooking vessel, such as a BBQ.

For an RF-based thermometer such as the thermometer 100, the antenna can be located in the same portion of the thermometer as an ambient sensor, which is just outside the food 108. Such an embodiment advantageously combines the antenna and the thermal sensor as the portion 102 discussed above with respect to FIG. 1. One challenge is that the portion 102 may often need to withstand high temperatures within the cooking vessel that can reach up to 400° C.

Referring to FIG. 11A, one embodiment for sensing ambient temperature is shown. An ambient thermal sensor 940 may include an RTD, or other passive high temperature sensor such as a thermistor. The ambient thermal sensor 940 is positioned at an end of the thermometer 900A, away from the food for better accuracy when the thermometer 900A is inserted into the food 908. The antenna 926 is also located in an end portion of the thermometer 900A in antenna region 902, to avoid reduction of RF performance since the food 908 may otherwise attenuate RF signals.

The thermal sensor wire or wires 942 electrically connect the ambient thermal sensor 940 with a PCB in the thermometer 900A. In order to reduce interference to antenna functionality due to inductive and capacitive coupling between the antenna 926 and the sensor wire(s) 942, some implementations can advantageously increase a high frequency impedance between the thermal sensor wire(s) 942 and the ground plane (shell) 944. Filter components 946 can also be added to mitigate the deterioration of RF performance. The filter components 946 may include ferrite beads, inductors, capacitors, resistors, and/or other electronic components configured to mitigate the effect.

In other implementations, the PCB of the thermometer 900A can include an infrared sensor to measure a temperature of the antenna region 902 instead of using the ambient thermal sensor 940 in the antenna region 902. The temperature of the antenna region would then indirectly indicate the ambient temperature near the exterior of the food 908. In such implementations, infrared light radiated from a component in the antenna region 902, such as the antenna 926 or the handle, is detected by the infrared sensor to measure a temperature in the antenna region 902. A light guide may also be used to direct the infrared light from the antenna region 902 to the infrared sensor.

Figure 11B:
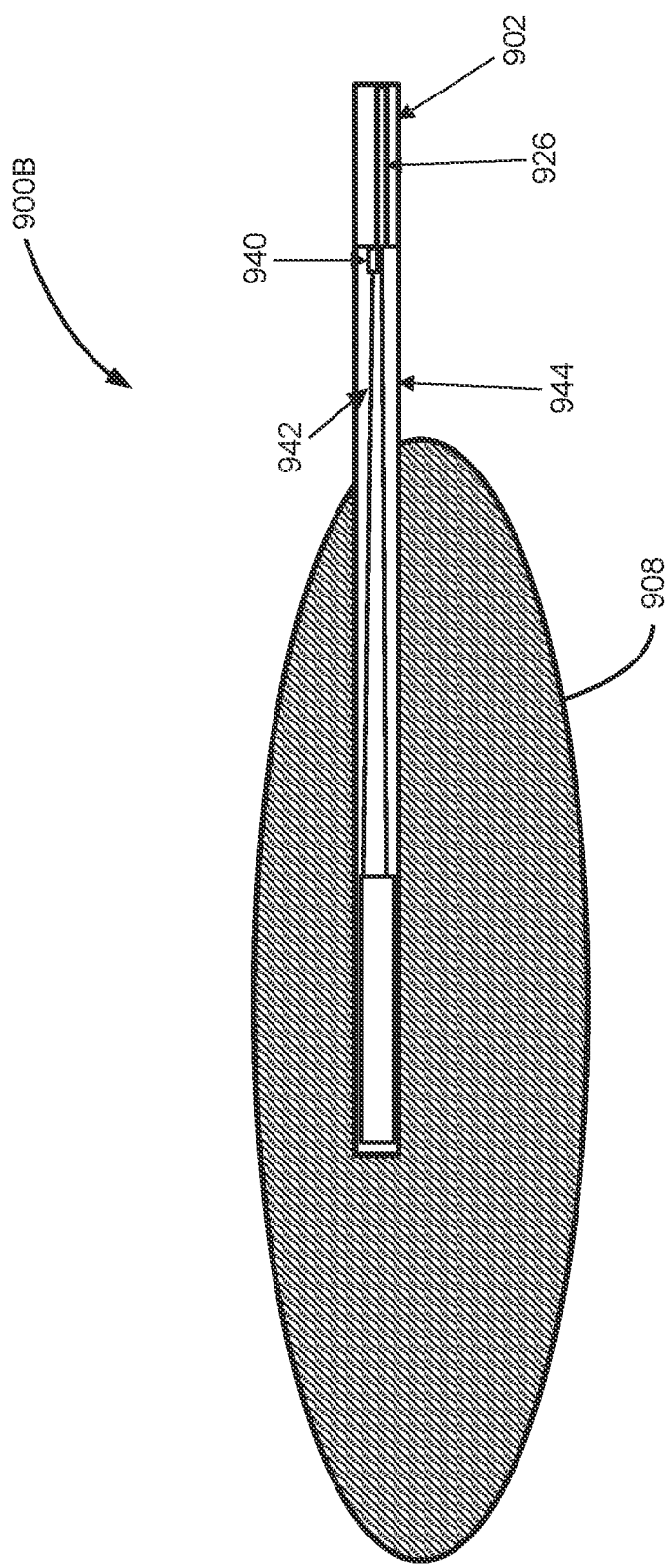
FIG. 11B shows a food thermometer including an ambient thermal sensor in a different location than in the food thermometer of FIG. 11A according to an embodiment.

Referring to FIG. 11B, an alternative arrangement of the thermometer 900B for sensing ambient temperature is shown. The ambient thermal sensor 940 may be an RTD, or other passive high temperature sensor. The location of the thermal sensor 940 can ordinarily reduce interference that might otherwise be caused by the thermal sensor 940. The antenna 926 is located at the distal end of the thermometer 900B, outside of the food 908 to avoid reduction of RF performance caused by the food 108 attenuating RF signals.

The ambient thermal sensor 940 is positioned outside of the antenna region 902 toward a center portion of the thermometer 900B and detects the ambient temperature via the antenna 926. In more detail, the ambient thermal sensor 940 is located inside the second portion 904 and is not directly exposed to the ambient space outside of the thermometer 900B. The ambient thermal sensor 940 is in thermal contact with the antenna 926 and indirectly detects the ambient temperature near an exterior portion of the food 908 via thermal conduction through the antenna 926, which may or may not be exposed to the ambient space near the exterior of the food 908.

One challenge associated with this arrangement is that the thermal sensor 940 is not directly detecting ambient temperature, but rather, the thermal sensor 940 is detecting the ambient temperature via mechanical couplings. Although thermometer 900B in FIG. 11B may have a better RF performance as compared to thermometer 900A in FIG. 11A, the thermal response for the thermal sensor 940 of thermometer 900B is typically slower and there can be some loss of thermal measurement resolution due to the indirect measurement through antenna 926.

Figure 11C:
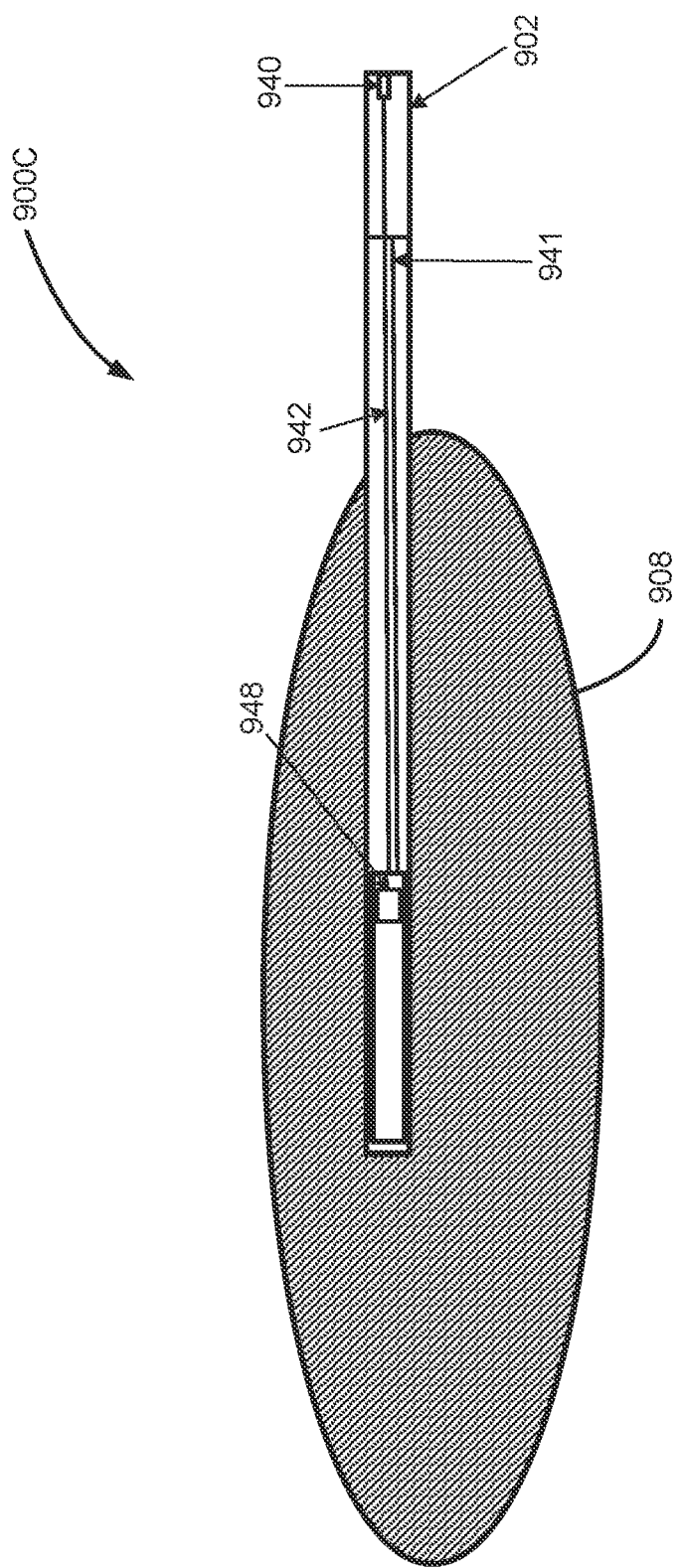
FIG. 11C shows a food thermometer including an ambient thermal sensor that is also used as an antenna according to an embodiment.

Referring to FIG. 11C, an alternative arrangement for sensing ambient temperature is shown. In thermometer 900C, the thermal sensor 940 and the thermal sensor wire or wires 942 are used as at least part of an antenna. As shown in FIG. 11C, the thermal sensor wiring 942 extends from the electronics of 920a in the first portion 906, and through the second portion 904 to reach the ambient thermal sensor 940 in the third portion 902. Mixer 948 combines RF signals to the thermal sensor wire(s) 942. Thermal sensor wire(s) 942 then work as antenna(s) after separating from ground reference 941. For ground referenced antennas, a dipole antenna could also be used but it may require a larger size for similar performance. The arrangement of thermometer 900C advantageously enhances RF performance and increases time and accuracy of the thermal sensor 940.

In order for the thermometer 900C to be re-chargeable, it can receive power from an external power source to recharge. This can be challenging when having to confine charging to an end of the thermometer (e.g., region 902 that houses the antenna 926) which is external to food 908. Antenna region 902 may have to endure relatively high ambient temperatures up to 400° C. and maintain sealing to prevent water or other contaminants from entering the thermometer 900C.

Referring to FIG. 11D, an external electric contact 950 is provided for charging the battery of the food thermometer 900D. The discrete external electric contact 950 is configured to allow the thermometer 900D to receive power from an external source, such as charging device 700 discussed above for recharging the battery.

In the example of FIG. 11D, the external electric contact 950 is connected with the antenna 926, thereby combining antenna and charging to relate to the same electrical signal. RF signals are separated from charging using a separator filter 948. This feature advantageously allows co-locating both types of signals in antenna region 902 without interference.

In an alternative arrangement, inductive charging can be applied to charge the thermometer 900D. However, inductive charging may require a relatively large inductive component. As such, some implementations can use a discrete charging contact instead of inductive charging due to advantages related to size, simplicity, and efficiency of the electronics.

In some implementations, the thermometer 900D can save power by turning off radio communications when charging via charging contact 950. This can ordinarily reduce the size of the battery needed for the thermometer 900D. In one implementation, a charging device such as charging device 700 can be used to communicate with electronics of the thermometer 900D via the charging contact 950. Wireless products may need user control for operations such as the BLUETOOTH® pairing process. The user may need to be able to send simple messages to the thermometer 900D by physical means before being able to establish RF communication. In conventional devices, such messages are usually given via mechanical means such as a push button or switch. In the example of thermometer 900D such messages may be sent by pressing a button on the charging device 700 and using the charging contact to send the message via a physical connection through antenna 926, thermal sensor 940, and thermal sensor wiring 942 to reach the separator filter 948, which can include RF/control signal filter components to separate received control signals from RF signals for transmission via antenna 926. In this regard, the filter components 948 can be utilized to separate control signals from RF signals. Control signals can be sent using low frequency signals, thereby making it easier to separate them from RF signals with frequency filters of the filter components 948.

The thermometer 900D may also need to sustain high temperatures and maintain sealing from external contaminants. Mechanical simplicity may then be desirable and can be obtained by avoiding additional mechanical switches or buttons on the thermometer 900D. The thermometer 900D can advantageously use the charging contact 950 to send signals to the portable electronic device, thereby enhancing mechanical simplicity.

Figure 11E:
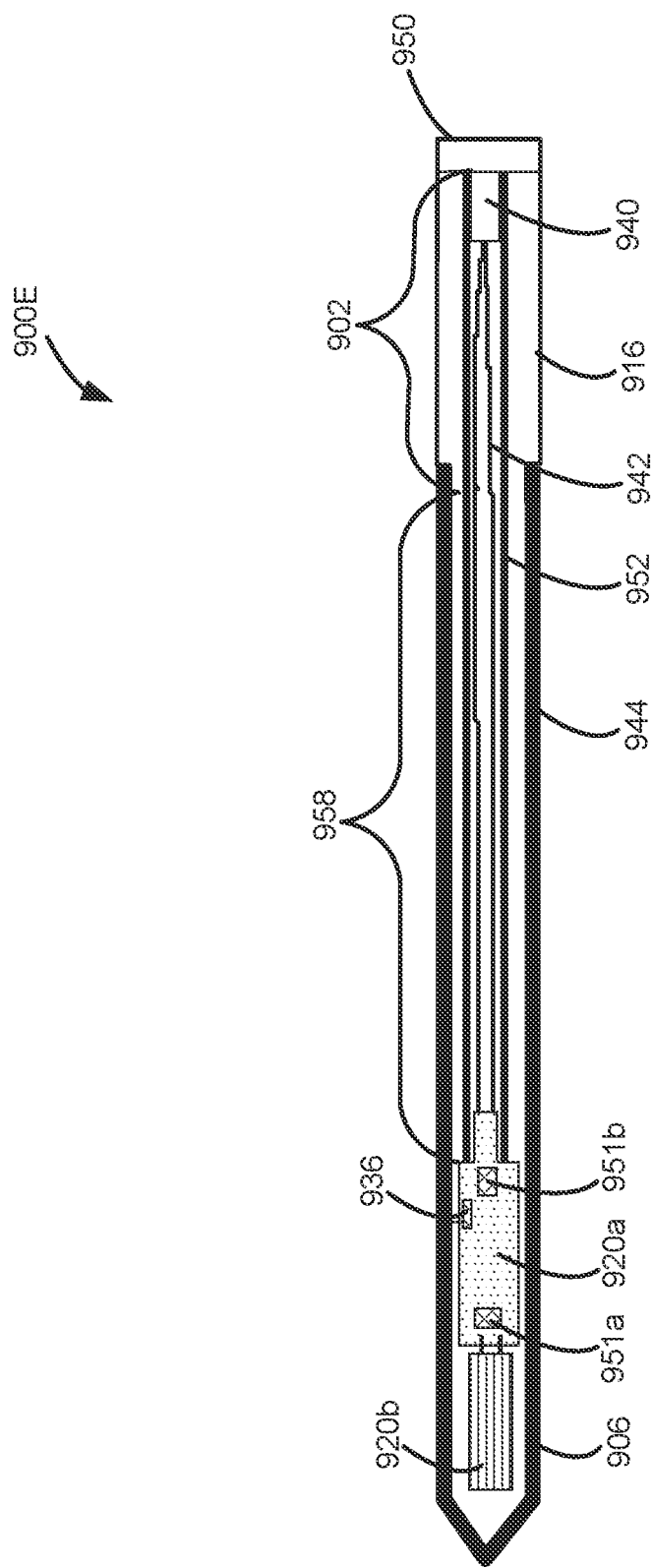
FIG. 11E shows a food thermometer including an inner shell according to an embodiment.

FIG. 11E illustrates an arrangement of the thermometer 900E where an inner shell 952 is used as at least part of an antenna in an antenna portion 926 of the inner shell 952, and also used as part of a coaxial wave guide with the outer shell 944 in a coaxial transmission portion 958 of the inner shell 952. As shown in FIG. 11E, the charging contact 950, thermal sensor 940, the thermal sensor wiring 942, and the antenna portion 926 of the inner shell 952 comprise an antenna. The antenna portion 926 is located within the hilt 916, which can include a ceramic material.

The inner shell 952 can be made of a conductive material such as copper, which can transmit a signal from the PCB 920a or other electronics in the first or second portions of the thermometer 900E to the antenna in the third portion 902 for transmission to a remote portable device or a charging device. The coaxial transmission portion 958 of the inner shell 952 is located within the metallic outer shell 944, which can include a stainless steel material. The metal outer shell 944 works with the coaxial transmission portion 958 of the inner shell 952 to serve as a waveguide so that an antenna RF signal is generally confined between the outer shell 944 and the inner shell 952 in the second portion.

The thermal sensor wiring 942 and the ambient thermal sensor 940 are located inside the inner shell 952, which generally shields them from the antenna RF signal between the inner shell 952 and the outer shell 944. As a result, interference is reduced in both the temperature signal conducted in the sensor wiring 942 and the antenna RF signal conducted in the coaxial transmission waveguide. In other words, placing the sensor wiring 942 inside the inner shell 952 can ordinarily avoid RF influence on the antenna signal and interference in the temperature signal carried in the sensor wiring 942. In this regard, some implementations may use air or another dielectric material as an insulator between the sensor wiring 942 and the inner shell 952 to further reduce interference between the temperature signal and the antenna signal.

In the example of FIG. 11E, the ambient thermal sensor 940 indirectly measures the ambient temperature through the charging contact 950. This can allow for the measurement of the ambient temperature at a preferred location on the end of the thermometer 900E. In some implementations, the ambient thermal sensor 940 can include a thermocouple.

The combination of the charging contact 950 and the inner shell 952 serves as a charging path for charging the battery 920b in the first portion 906 of the thermometer 900E. The PCB 920a located in the second portion 904 and includes grounded terminals 951 at both the terminal 951a connecting the battery 920b and at the terminal 951b connecting the sensor wiring 942. The terminals 951 are grounded on the outer metal shell 944, and the contacts for the thermal sensor wiring 942 on the PCB 920a are inside the inner shell 952 to further reduce possible RF interference. The PCB 920a can include a microstrip line for carrying an antenna signal and a transformer to convert the antenna signal from the microstrip line to the coaxial transmission portion of the inner shell 952.

The thermal sensor 936 in mounted on the PCB 920a and detects a temperature of the outer shell 944 for measuring a temperature of the interior of the food. Since sensor 936 is behind the coaxial transmission portion of the inner shell 952, there is no interference with the RF antenna signal transmitted to the antenna portion 902.

In summary, the inner shell 952 is configured to provide one or more of four different functions in the thermometer 900E. The first function can be as at least part of an antenna in the antenna portion 902 of the inner shell 952. The second function can be as a coaxial transmission line inside the outer shell 944 to carry a signal between the antenna portion 902 and electronics, such as those located on the PCB 920a. The third function can be as a conductor for charging the battery 920b via the charging contact 950. The fourth function can be for communicating an activation or deactivation of the thermometer 900E depending on whether the thermometer 900E is charging via the charging contact 950. As noted above, activation can include enabling a pairing mode via the antenna.

By serving multiple functions with the inner shell 952, it is ordinarily possible to condense the size of thermometer 900E, while improving its performance in terms of the RF signal of the antenna and the accuracy of ambient temperature measurement.

Figure 12:
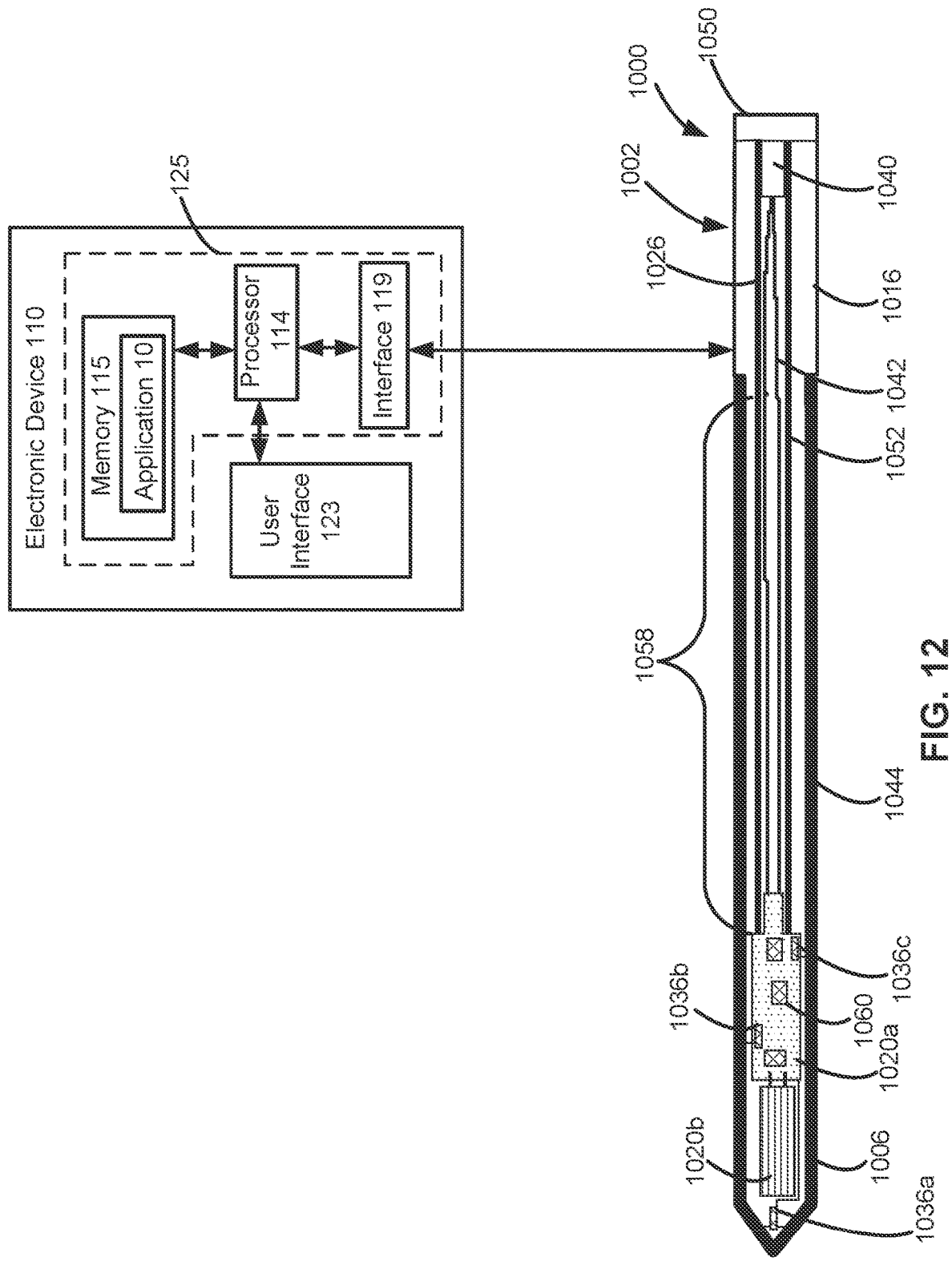
FIG. 12 shows an electronic device including a user interface and a food thermometer including a plurality of thermal sensors and a flip sensor according to an embodiment.

FIG. 12 shows electronic device 110 including user interface 123 and circuitry 125. As discussed above with reference to the example of FIG. 3B, electronic device 110 may include, for example, a smartphone, a tablet, a smart watch, or a laptop. FIG. 12 also shows food thermometer 1000 including a plurality of thermal sensors 1036 and a flip sensor 1060.

As shown in the example of FIG. 12, circuitry 125 of electronic device 110 includes memory 115, processor 114, and interface 119. Processor 114 is configured to execute application 10 stored in memory 115 for processing data wirelessly received from food thermometer 1000 via interface 119, and presenting information to a user via user interface 123. Application 10 can include computer-executable instructions for providing information based on data wirelessly received from food thermometer 1000, such as a recipe including instructions or recommendations that can automatically progress from one stage to the next stage based on data wirelessly received from food thermometer 1000.

User interface 123 of electronic device 110 may include, for example, a touchscreen, a display, LEDs, and/or a speaker. Circuitry 125 may control an output of user interface 123 based on the execution of application 10 and/or user input received from a user via user interface 123. User interface 123 may also be controlled to display information such as a current temperature or a time remaining for cooking food based on the recipe. Food thermometer 1000 sends data such as temperature data or orientation data to interface 119 of electronic device 110, which may include, for example, a BLUETOOTH® interface. Processor 114 of electronic device 110 may also optionally send the processed data or data generated from executing the application 10 to a wireless network, such as a Wi-Fi network, via an interface of the electronic device, such as via interface 117 in the example of electronic device 110a in FIG. 3B discussed above.

User interface 123 of electronic device 110 can, for example, display a current temperature of the food, a completion time prediction, or recommendations on how to cook food to achieve a result specified by the user such as a final doneness of the food (e.g., medium or well-done). As discussed in more detail below with reference to the example recipe progression processes of FIGS. 13 to 15B, the recommendations or cooking instructions provided by user interface 123 and circuitry 125 can include an automatic progression through stages of a recipe for cooking the food. Such stages can include, for example, detection that food thermometer 1000 has been inserted into food, detection that the food has been placed inside a heated cooking vessel or cooking appliance, instructions to perform basting, adjustments to the temperature of the cooking vessel, instructions to flip the food (e.g., a steak), instructions to remove the food from heat, a recommendation that the food is ready to eat (i.e., how long to let the food rest outside the cooking vessel before serving), and/or when to sear the food. As noted above, devices known in the art have not been able to accurately predict completion times, predict a resting temperature rise after removing the food from the cooking vessel, or provide accurate instructions on when to adjust the cooking temperature or perform another cooking action, such as the example stages noted above.

As shown in the example of food thermometer 1000 in FIG. 12, the construction of the food thermometer 1000 can be similar to that of food thermometer 900E discussed above with reference to FIG. 11E. Food thermometer 1000 in FIG. 12 includes an inner shell 1052 that is used as at least part of an antenna in an antenna portion 1026 of the inner shell 1052, and also used as part of a coaxial wave guide with the outer shell 1044 in a coaxial transmission portion 1058 of the inner shell 1052. In addition, food thermometer 1000 includes charging contact 1050, ambient thermal sensor 1040, and thermal sensor wiring 1042 for ambient thermal sensor 1040. Antenna portion 1026 of the inner shell 1052 comprises an antenna located within the hilt 1016, which can include a ceramic material.

Inner shell 1052 can be made of a conductive material such as copper, which can transmit a signal from PCB 1020a or other electronics in the first or second portions of the thermometer 1000 to the antenna in the third portion 1002 for transmission to electronic device 110. The antenna 1026 in the third portion 1002 may also be used to wirelessly receive signals or data from electronic device 110 for processing by circuitry of PCB 1020a. The coaxial transmission portion 1058 of the inner shell 1052 is located within the metallic outer shell 1044, which can include a stainless steel material. The metal outer shell 1044 works with the coaxial transmission portion 1058 of the inner shell 1052 to serve as a waveguide so that an antenna RF signal is generally confined between the outer shell 1044 and the inner shell 1052 in the second portion.

The thermal sensor wiring 1042 and the ambient thermal sensor 1040 are located inside the inner shell 1052, which generally shields them from the antenna RF signal between the inner shell 1052 and the outer shell 1044. As a result, interference is reduced in both the temperature signal conducted in the sensor wiring 1042 and the antenna RF signal conducted in the coaxial transmission waveguide. In other words, placing the sensor wiring 1042 inside the inner shell 1052 can ordinarily reduce RF influence on the antenna signal and interference in the temperature signal carried in the sensor wiring 1042. In this regard, some implementations may use air or another dielectric material as an insulator between the sensor wiring 1042 and the inner shell 1052 to reduce interference between the temperature signal and the antenna signal.

In the example of FIG. 12, the ambient thermal sensor 1040 indirectly measures the ambient temperature through the charging contact 1050. This can allow for the measurement of the ambient temperature near or adjacent to an exterior surface of the food when thermometer 1000 is inserted into the food. In some implementations, the ambient thermal sensor 1040 can include a thermocouple.

As with the example of food thermometer 900E discussed above with reference to FIG. 11E, the combination of the charging contact 1050 and the inner shell 1052 in FIG. 12 can serve as a charging path for charging the battery 1020b in the first portion 1006 of the thermometer 1000. However, food thermometer 1000 in FIG. 12 differs from thermometer 900E in that thermometer 1000 includes three internal food thermal sensors 1036a, 1036b, and 1036c configured to measure an internal temperature of the food at different locations. As shown in FIG. 12, thermal sensor 1036a can measure a temperature of outer shell 1044 at a tip of thermometer 1000, thermal sensor 1036b can measure a temperature of outer shell 1044 at a middle section of first portion 1006, and thermal sensor 1036c can measure the temperature of outer shell 1044 at a location closer to coaxial transmission portion 1058. In the example of FIG. 12, each of thermal sensors 1036a, 1036b, and 1036c is located behind the coaxial transmission portion of the inner shell 1052, so there is limited interference with the RF antenna signal transmitted to the antenna portion 1002.

In some implementations, temperature data or a temperature measurement from any one of the three thermal sensors 1036 can cause circuitry 125 of electronic device 110 to progress a recipe on user interface 123 to a next stage, or to determine a rate at which an indication of the food temperature changes, which may be used to estimate a completion time as in the process of FIG. 4 and/or estimate a resting temperature rise as in the process of FIG. 5 discussed above. In one such example, circuitry 125 may use a coldest indication of food temperature to determine the rate at which the indication of food temperature changes or to progress a recipe from among three indications of food temperature corresponding to temperatures measured by internal food thermal sensors 1036a, 1036b, and 1036c, respectively. In other implementations, the temperature measurements from the three thermal sensors 1036 may be averaged together. As will be appreciated by those of ordinary skill in the art, other implementations of thermometer 1000 may include a different number of internal food thermal sensors 1036.

In addition to including multiple internal food thermal sensors 1036, thermometer 1000 in FIG. 12 also differs from thermometer 900E of FIG. 11E in that PCB 1020a includes a flip sensor 1060 configured to detect flipping of food when the food is flipped upside down and the food thermometer 1000 is inserted into the food. Flip sensor 1060 can include, for example, a Micro-Electro-Mechanical System (MEMS) gyroscope, an accelerometer, a gravity switch, or other type of circuitry capable of detecting a change in orientation of the thermometer 1000. In other implementations, flip sensor 1060 may not be located on PCB 1020a. For example, flip sensor 1060 in other implementations may be located inside inner shell 1052.

Food thermometer 1000 can wirelessly send orientation data to electronic device 110 indicating a flipping or turning upside down of the thermometer 1000 that is detected by flip sensor 1060. For example, circuitry 125 of electronic device 110 may have previously determined that thermometer 1000 had been inserted into food by a sudden drop in a temperature measured by one or more of thermal sensors 1036, and circuitry 125 may then have determined from wirelessly received temperature data indicating a temperature measured by ambient thermal sensor 1040 that the food had been placed in a heated cooking vessel or cooking appliance. A stage in a recipe displayed by user interface 123 may indicate that the food should be flipped based on temperature data wirelessly received from food thermometer 1000. Circuitry 125 may then automatically progress the recipe on user interface 123 to the next stage following the flipping instruction or flipping stage in response to orientation data received from food thermometer 1000 indicating a detected flipping of the food.

Figure 13:
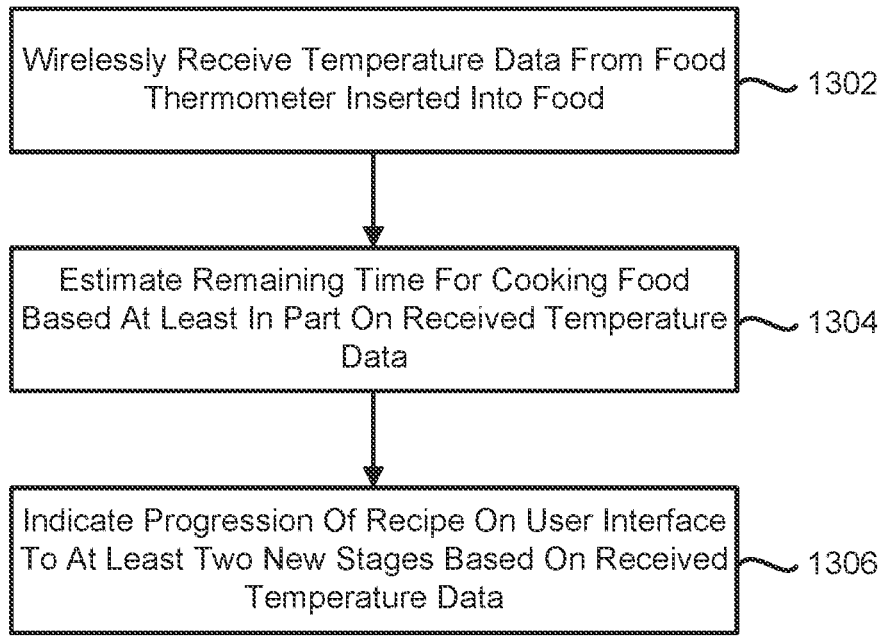
FIG. 13 is a flowchart for a recipe progression process according to an embodiment.

FIG. 13 is a flowchart for a recipe progression process that can be performed by circuitry of an electronic device, such as by circuitry 125 of electronic device 110 in FIG. 12, according to an embodiment. In block 1302, temperature data is wirelessly received from a food thermometer (e.g., food thermometer 900E in FIG. 11E or food thermometer 1000 in FIG. 12) inserted into food. The temperature data can indicate one or more temperatures measured by a thermal sensor of the food thermometer, such as thermal sensors 1036a, 1036b, 1036c, or ambient thermal sensor 1040 in FIG. 12. The temperature data may reflect multiple temperatures taken at different points in time by one or more thermal sensors. In some implementations, the wirelessly received temperature data in block 1302 is received at various times throughout preparation of the food using the recipe. For example, the food thermometer may send temperature data indicating internal food temperatures every 30 seconds, while the food thermometer sends temperature data indicating an ambient temperature adjacent an exterior of the food every 60 seconds. The temperature data can be received via an interface of the circuitry, such as a BLUETOOTH® interface (e.g., interface 119 in FIG. 12).

In block 1304, the circuitry of the electronic device estimates a remaining time for cooking the food based at least in part on the received temperature data. As discussed above with reference to the completion time estimation process of FIG. 4, the circuitry may determine a rate at which a temperature indicated by the temperature data has changed. For example, the circuitry may subtract a previously indicated temperature from the temperature indicated by the received temperature data and divide by the difference in time between the two measurements. The time of the measurements may be included as part of the temperature data received from the food thermometer or may be set by the circuitry as when the temperature data was received. In some examples, the circuitry may determine a temperature rise value based on an indication of an ambient temperature indicated by wirelessly received temperature data, as discussed above with reference to the completion time estimation process of FIG. 4. In such an example, an ambient temperature range can be used to select a temperature rise value, X, and an amount of time for an internal food temperature to increase by X may be used to estimate the remaining time for cooking the food.

As discussed above in more detail with reference to the completion time estimation process of FIG. 4, the temperature rise value X can be selected from different temperature rise values corresponding to different ambient temperature ranges and/or types of food. In such an example, a table of temperature rise values can be stored in a memory of the electronic device (e.g., memory 115 in FIG. 12) for access by a processor of the electronic device. A user of the electronic device may select a food type or recipe for preparing the food from a plurality of food types or recipes (e.g., ribeye steak, sirloin steak, chicken), with the different food types or recipes being associated with different temperature rise values for the same ambient temperature value or range of ambient temperature values. The selection of a food type or recipe can ordinarily further customize the estimation of a completion time or a remaining time for cooking the food.

In block 1306, the circuitry indicates the progression of the recipe on the user interface of the electronic device to at least two new stages based on temperature data wirelessly received from the food thermometer. In some cases, the progression to a new stage in the recipe may be the result of a specific threshold temperature being reached. In other cases, the progression to the new stage may be based on a certain amount of time passing, such as the estimated remaining time in block 1304. In this regard, the progression to the new stage based on reaching an estimated time for the completion of cooking or an intermediate stage derived from the estimated remaining time is also based on the wirelessly received temperature data, since the temperature data was used to estimate the remaining time in block 1304.

As examples of stages that are discussed in more detail below with reference to the recipe progression processes of FIGS. 14 to 15B, a preparation for cooking stage may begin or end with a detected drop in an internal food temperature resulting from the food thermometer being inserted into the food, and the recipe may progress to a first cooking stage after an ambient temperature exceeds a threshold value resulting from the food being initially heated. The recipe may further progress to a basting stage or other intermediate preparation stage that may require opening the cooking vessel in response to a detected increase in ambient temperature after the cooking vessel is closed. In another example, the recipe may progress from a second cooking stage to a resting stage where the food has been removed from heat due to a detected decrease in ambient temperature from the cooking vessel being opened and the food removed. In yet another example, the recipe may progress from a resting stage to a ready to serve or eat stage in response to the internal temperature of the food reaching a maximum temperature or being within a range of the maximum temperature. In yet another example, the recipe may progress to a searing stage due to a detected decrease in the internal temperature of the food by a threshold value after reaching the maximum temperature. As will be appreciated by those of ordinary skill in the art in light of the present disclosure, various stages of a recipe may progress or advance on the user interface based on wirelessly received temperature data from the food thermometer.

Figure 14:
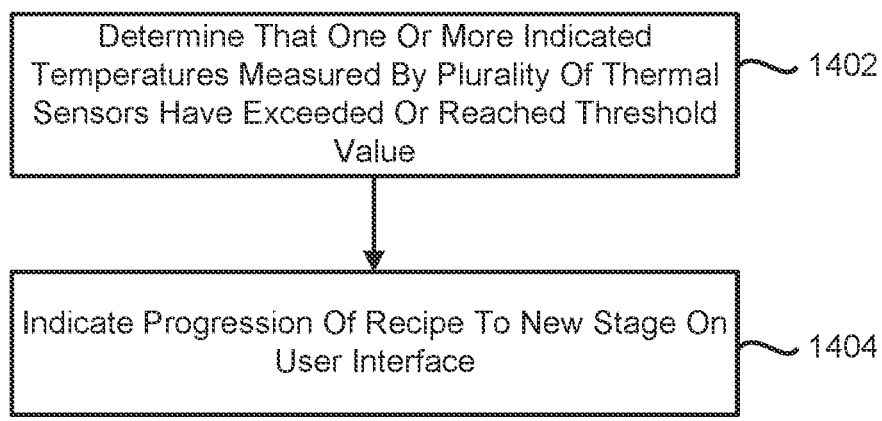
FIG. 14 is a flowchart for a recipe progression process for use with a food thermometer including a plurality of thermal sensors according to an embodiment.

FIG. 14 is a flowchart for a recipe progression process for use with a food thermometer including a plurality of thermal sensors according to an embodiment. The process of FIG. 14 may be performed by circuitry of an electronic device, such as by circuitry 125 of electronic device 110 in FIG. 12 in communication with food thermometer 1000 including thermal sensors 1036a, 1036b, and 1036c.

In block 1402, the circuitry determines that one or more of the temperatures indicated by wirelessly received temperature data from the food thermometer exceeds a threshold value. For example, the circuitry may receive three temperatures representing an interior temperature of the food at three different locations. The circuitry may then determine that one of the three temperatures exceeds a threshold value for progressing to a next stage in a recipe, such as a threshold value for removing the food from heat, serving the food, or searing the food.

In block 1404, the circuitry indicates the progression of the recipe on a user interface in response to determining that one or more of the indicated temperatures exceed the threshold value. In some implementations, a temperature measured by one thermal sensor may be a high maximum temperature, and the temperature may continue to increase at the other locations during a resting stage of the recipe, as discussed above with reference to the processes of FIGS. 4 and 5. In other implementations, the circuitry may have different temperature threshold values for different thermal sensors depending on their relative locations. For example, temperature thresholds for sensors closer to the tip of the food thermometer may be higher than for thermal sensors farther from the tip. The circuitry in some implementations may require reaching a threshold value or values for multiple thermal sensor locations before progressing to the next stage in the recipe.

Figure 15A:
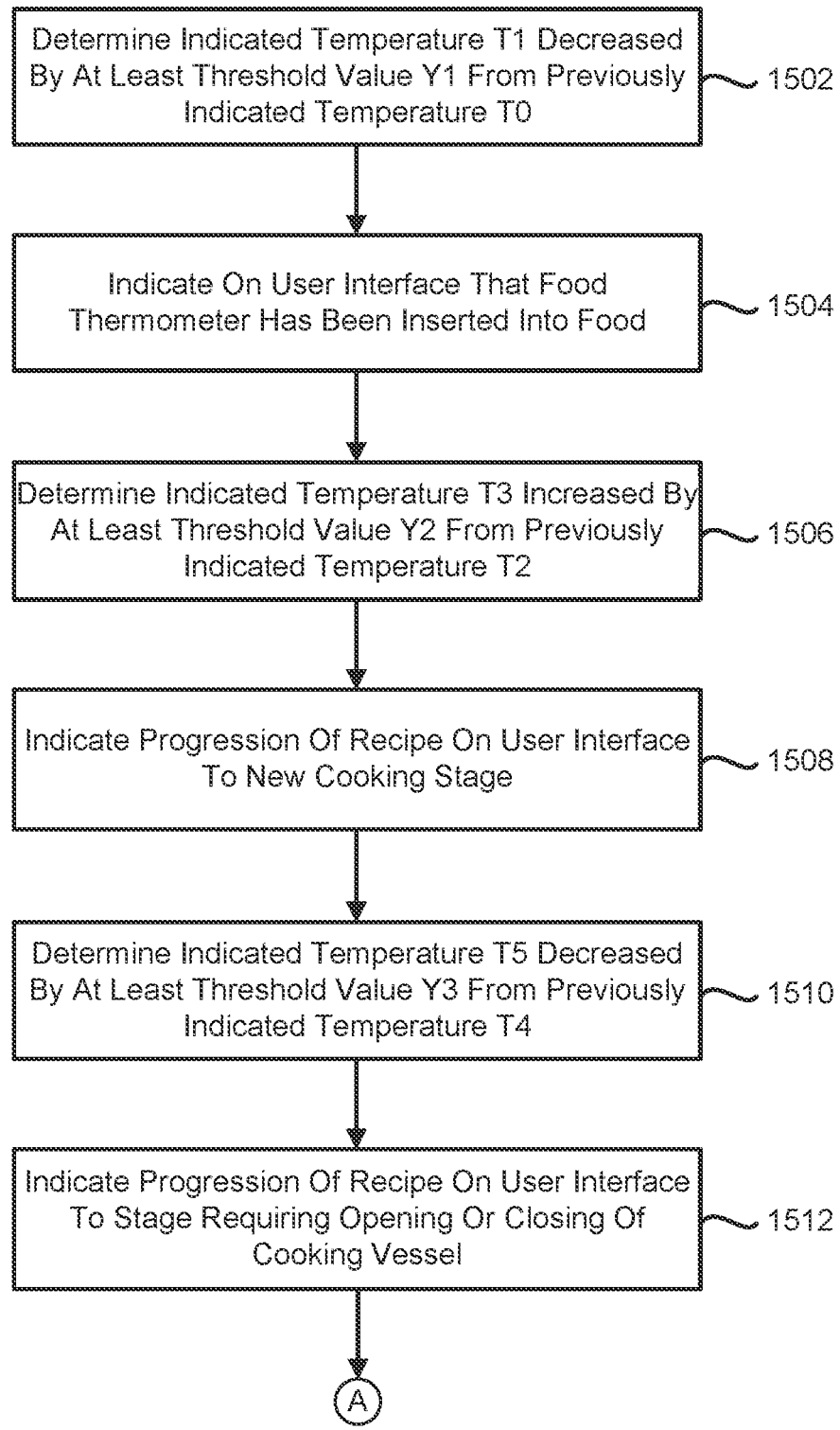
FIG. 15A is a first part of a flowchart for a recipe progression process that includes a resting stage, a searing stage, and one or more stages requiring the opening or closing of a cooking vessel according to an embodiment.
Figure 15B:
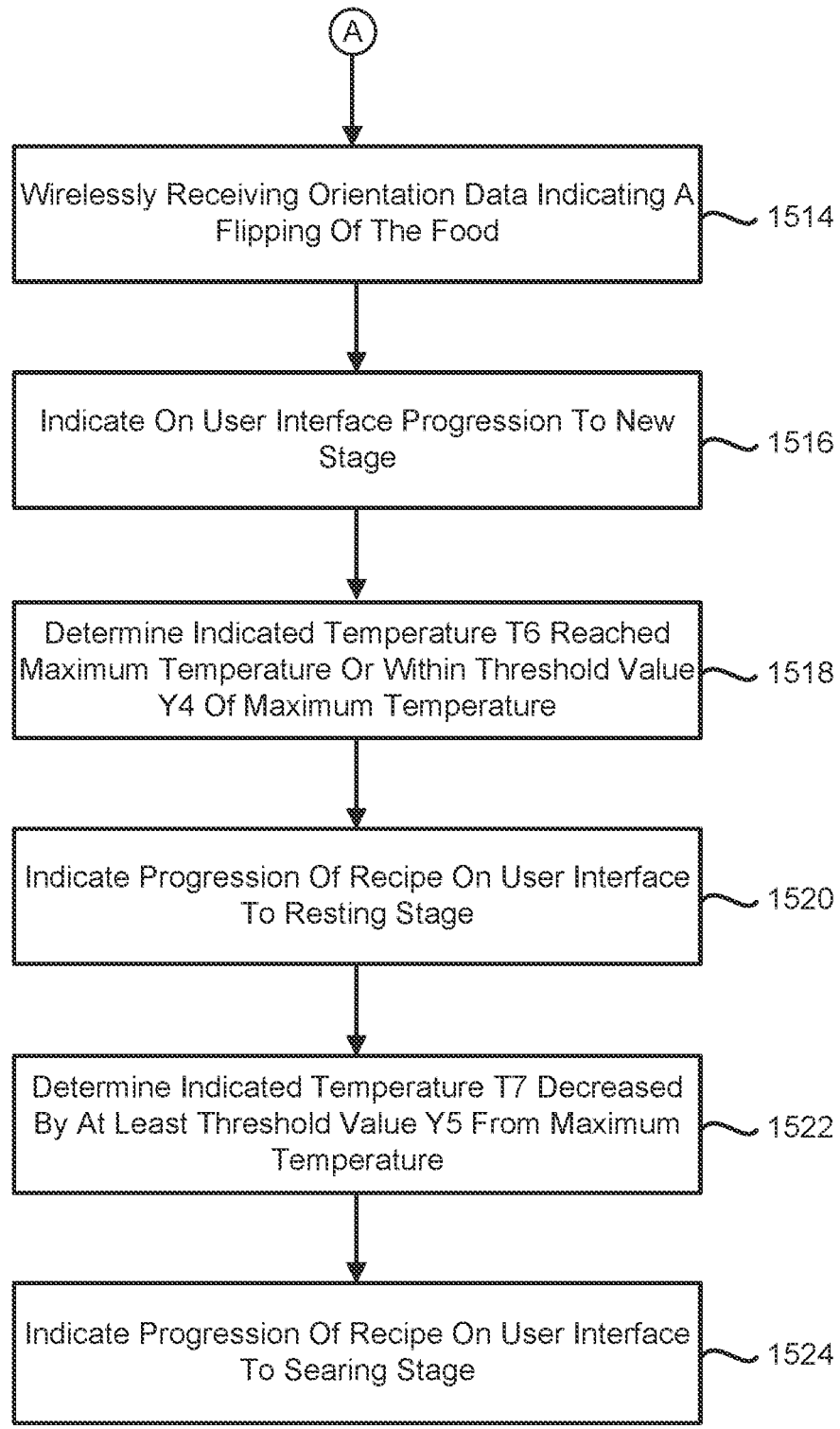
FIG. 15B is the second part of the flowchart of FIG. 15A.

FIGS. 15A and 15B provide a flowchart for a recipe progression process including a resting stage, a searing stage, and one or more stages requiring the opening or closing of a cooking vessel according to an embodiment. The process of FIGS. 15A and 15B may be performed by circuitry of an electronic device, such as by circuitry 125 of electronic device 110 in FIG. 12 in communication with food thermometer 1000.

In block 1502, the circuitry determines that a temperature T1 indicated by wirelessly received temperature data from the food thermometer has decreased by at least a threshold value of Y1 from a previously indicated temperature of T0. The previously indicated temperature T0 can represent a temperature measured by an internal food thermal sensor of the food thermometer (e.g., any of sensors 1036a, 1036b, or 1036c in FIG. 12), which was wirelessly received from the food thermometer before it was inserted into the food. In some implementations, the threshold value Y1 may be 5° C., such that a drop of 5° C. within a 60 second interval can trigger the progression to the next stage of the recipe from an initial preparation stage, which may correspond to the food thermometer being removed from a charging or storage device.

In block 1504, the circuitry indicates on the user interface that the food thermometer has been inserted into the food. This initial progression of the recipe can be automatic from the perspective of the user in that the circuitry determines that the measured temperature has decreased by at least the threshold value within a certain period of time, and updates the recipe on the user interface to instruct the next stage of the recipe, such as putting the food in a preheated cooking vessel.

In block 1506, the circuitry determines that a temperature T3 indicated by wirelessly received temperature data has increased by at least a threshold value Y2 from a previously indicated temperature T2. The previously indicated temperature T2 can represent a temperature measured by an internal food thermal sensor of the food thermometer (e.g., any of thermal sensors 1036a, 1036b, or 1036c in FIG. 12) or an ambient thermal sensor of the food thermometer (e.g., thermal sensor 1040 in FIG. 12), which was wirelessly received from the food thermometer before the food was placed in the heated cooking vessel or after the food was placed in the heated cooking vessel.

In block 1508, the circuitry indicates the progression of the recipe on the user interface to a new cooking stage. In some examples, the new cooking stage could be a general cooking stage with an indication that the remaining cooking time or completion cooking time is being estimated. In other examples, the new cooking stage may indicate that a target temperature has been reached for performing a different operation such as basting the food or another intermediate preparation stage, such as flipping the food or adding an ingredient.

In block 1510, the circuitry determines that a temperature T5 indicated by wirelessly received temperature data has decreased by at least a threshold value Y3 from a previously indicated temperature T4. The previously indicated temperature T4 can represent a temperature measured by an ambient thermal sensor of the food thermometer (e.g., thermal sensor 1040 in FIG. 12), which was wirelessly received from the food thermometer before the food was removed from the heated cooking vessel.

In block 1512, the circuitry indicates the progression of the recipe on the user interface to a stage requiring opening or closing of the cooking vessel. In some examples, the new cooking stage could include instructions for basting the food or other instructions that would require accessing the food, such as flipping the food or adding an ingredient. In other examples, the new cooking stage may indicate that cooking has continued after performing an action requiring the food to be removed from the cooking vessel or accessed via an opening in the cooking vessel. In such examples, the interface may indicate in the new stage that a new remaining cooking time is being estimated or the previously estimated cooking time may continue following the return of the food to the cooking vessel or the detected closing of the cooking vessel as determined by an ambient temperature measured by the food thermometer.

Proceeding from block 1512 in FIG. 15A, the circuitry in block 1514 of FIG. 15B wirelessly receives orientation data from the food thermometer. The orientation data can indicate a flipping or turning of the food, and can come from an orientation sensor, such as flip sensor 1060 in the example of FIG. 12 discussed above. In some implementations, the food thermometer may only send orientation data when there is a change in the orientation or a detected flipping. The circuitry may then determine whether to progress to a next stage in the recipe based on a current stage in the recipe or a current condition, such as temperatures indicated by wirelessly received temperature data.

In block 1516, the circuitry indicates the progression to a new stage in the recipe using the user interface. From the perspective of the user, the progression of the recipe on the user interface to the new stage is automatic. For example, an instruction, recommendation, or stage of the recipe may instruct the user to flip the food based on an internal temperature of the food. When the circuitry determines that an internal temperature indicated by the wirelessly received temperature data has reached a threshold temperature for flipping, the circuitry controls the user interface to display an instruction or stage for flipping the food. The user flips the food, and orientation data is sent from the food thermometer indicating that the food has been flipped. The circuitry in block 1516 then automatically progresses the recipe on the user interface to the next stage, such as to a final cooking stage.

In block 1518, the circuitry determines that a temperature T6 indicated by wirelessly received temperature data has reached a maximum temperature or is within the maximum temperature by at least a threshold value Y4. The maximum temperature can be set by the circuitry as part of the recipe or the selection of a type of food and/or desired doneness of the food. In some implementations, the maximum temperature can include a target temperature set by the user via the user interface, such as an internal food temperature of 140° F. for a medium cooked steak. In other implementations, the maximum temperature may be determined by the circuitry by comparing a current temperature to a previous temperature and identifying a decrease in the temperature over time.

In other embodiments, the maximum temperature may instead correspond to a maximum ambient temperature for the cooking vessel, such as for a smoker where the temperature is to be kept below the maximum temperature. In such cases, the circuitry can alert or instruct the user to lower the temperature of the cooking vessel via the user interface in response to the determination that the ambient temperature of the cooking vessel reached or exceeded the maximum temperature.

Returning to the example of FIG. 15B, the circuitry in block 1520 indicates the progression of the recipe on the user interface from a resting stage to a ready to serve or eat stage. In some implementations, reaching the maximum temperature or being within the threshold value Y4 of the maximum temperature inside the food can indicate that the heat within the food has equalized and will not continue to increase during resting. As discussed above, certain foods, such as most meats will experience a resting temperature rise following the removal of the food from the cooking vessel.

In block 1522, the circuitry determines that a temperature T7 indicated by wirelessly received temperature data has decreased by at least a threshold value Y5 from the maximum temperature. As noted above, the maximum temperature can be set by the circuitry as part of the recipe or the selection of a type of food and/or desired doneness of the food. In some implementations, the maximum temperature can include a target temperature set by the user via the user interface. In other implementations, the maximum temperature may be determined by the circuitry by comparing a current temperature to a previous temperature and identifying a decrease in temperature over time, such as during the resting stage of block 1520 discussed above.

In block 1524, the circuitry indicates progression of the recipe on the user interface to a searing stage. For example, threshold value Y5 may be 10° C. and the maximum temperature during the resting stage may have been 60° C. This can allow for the food to be seared without overcooking the food during the searing stage. In response to determining that the internal temperature of the food has decreased to 50° C. based on wirelessly received temperature data, the circuitry can progress the recipe to the searing stage or instruct the user via the user interface that the food is ready for searing.

Those of ordinary skill in the art in light of the present disclosure will appreciate that other embodiments of the recipe progression process of FIGS. 15A and 15B may not include all of the blocks discussed above. For example, some embodiments of a recipe may not include a flipping stage such that blocks 1514 and 1516 are omitted, or some recipes may not include a searing stage, such that blocks 1522 and 1524 are omitted.

FIG. 16A is an assembly view of food thermometer 1600 including thermal barrier member 1662 in first portion 1606 of food thermometer 1600 and closer to tip portion 1612 than minimum food insertion depth indicator 1664. FIG. 16B is an assembled cross-section view of food thermometer 1600.

As shown in the example of food thermometer 1600 in FIGS. 16A and 16B, the construction of the food thermometer 1600 can be similar to that of food thermometers 900E and 1000 discussed above with reference to FIGS. 11E and 12. As with the example of food thermometers 900E and 1000 discussed above, the combination of the charging contact 1650 and wiring in inner shell 1652 in FIGS. 16A and 16B can serve as a charging path for charging the battery 1620b in the first portion 1606 of the food thermometer 1600.

Food thermometer 1600 in FIGS. 16A and 16B includes an inner shell 1652 that is used as at least part of an antenna in an antenna portion 1626 of the inner shell 1652, and also used as part of a coaxial wave guide with the outer shell 1644 (i.e., including first metallic outer shell 1644a and second metallic outer shell 1644b) in a coaxial transmission portion 1658 of the inner shell 1652. As shown in FIG. 16A, outer shell 1644 defines a virtual axis through a center of outer shell 1644. In addition, food thermometer 1600 includes charging contact 1650, ambient thermal sensor 1640, and thermal sensor wiring 1642 for ambient thermal sensor 1640. Antenna portion 1626 of the inner shell 1652 can form part of an antenna in third portion 1602. In the example of FIGS. 16A and 16B, the antenna may include metal components located in third portion 1602, which can include hilt 1616, fitting 1668, and charging contact 1650, all of which may be formed of stainless-steel, for example. In other implementations, hilt 1616 may additionally or alternatively include a ceramic material for handling of the food thermometer, as discussed above for hilts or handles of other food thermometers disclosed herein.

As shown in FIGS. 16A and 16B, connection adapter 1660 allows connection of sensor wiring 1642 and inner shell 1652 to PCB 1620a, such as by soldering. Inner shell 1652 can be made of a conductive material such as copper, which can transmit a signal from PCB 1620a or other electronics in the first or second portions of the food thermometer 1600 to the antenna portion 1626 in the third portion 1602 for transmission to an electronic device, such as electronic device 110 in FIG. 12. In this regard, the inner shell 1652 serves as antenna portion 1626 in the third portion 1602, and may also be used to wirelessly receive signals or data from an electronic device for processing by circuitry of PCB 1620a.

In some implementations, inner shell 1652 and sensor wiring 1642 may form part of a Mineral Insulated (MI) cable, such as with a copper inner shell 1652 and copper sensor wiring 1642 and magnesium oxide filling the space between the sensor wiring 1642 and inner shell 1652. Other Mineral Insulated Metal Sheathed (MIMS) cables may alternatively be used, such as where inner shell 1652 is stainless-steel. Such MI or MIMS cables can allow for a smaller diameter inner shell 1652, which can free up space for a smaller overall outside diameter of food thermometer 1600. Other implementations may use another dielectric material, such as air, as an insulator between the sensor wiring 1642 and the inner shell 1652 to reduce interference between the temperature signal from ambient thermal sensor 1640 and the antenna signal. In some implementations, sensor wiring 1642 may only include a single sensor wire for thermal sensor 1640, and may use inner shell 1652 as a second sensor wire for thermal sensor 1640.

The coaxial transmission portion 1658 of the inner shell 1652 is located within the second metallic outer shell 1644b and partially located within first metallic outer shell 1644b, both of which can include a stainless-steel material in some implementations. The first metallic outer shell 1644a and the second metal outer shell 1644b work with the coaxial transmission portion 1658 of the inner shell 1652 to serve as a waveguide so that an antenna RF signal is generally confined between the outer shells 1644 and the inner shell 1652.

The thermal sensor wiring 1642 and the ambient thermal sensor 1640 are located inside the inner shell 1652, which generally shields them from the antenna RF signal between the inner shell 1652 and the outer shells 1644*a* and 1644*b*. As a result, interference is reduced in both the temperature signal conducted in the sensor wiring 1642 and the antenna RF signal conducted in the coaxial transmission waveguide. In other words, placing the sensor wiring 1642 inside the inner shell 1652 can ordinarily reduce RF influence on the antenna signal and interference in the temperature signal carried in the sensor wiring 1642.

In the example of FIGS. 16A and 16B, the ambient thermal sensor 1640 indirectly measures the ambient temperature through the charging contact 1650 and its wiring, which may only carry a signal when food thermometer 1600 is being charged or programmed (e.g., a firmware update), such as when food thermometer 1600 is in a charging device (e.g., charging device 700 in FIGS. 9A and 9B) and not using antenna portion 1626 for RF communications. The use of ambient thermal sensor 1640 in third portion 1602 can allow for the measurement of the ambient temperature near or adjacent to an exterior surface of the food when thermometer 1600 is inserted into the food. In some implementations, the ambient thermal sensor 1640 can include a thermocouple.

Thermal barrier member 1662 is configured to thermally insulate the interior of first portion 1606 from at least a portion of the interior of second portion 1604 and protect against heat from conducting from a side of barrier member 1662 closest to hilt 1616 toward an opposite side of barrier member 1662 closest to tip portion 1612. In some implementations, barrier member 1662 may house or comprise a thermally insulating material, such as a ceramic or glass material. Barrier member 1662, in some implementations, can provide a hermetic or air-tight seal and may be affixed inside second metallic outer shell 1644*b* using, for example, an adhesive. In this regard, an adhesive may be used to seal barrier member 1662 along the inside surface of first metallic outer shell 1644*a* and across an inner opening in barrier member 1662 to hermetically seal the interior of first portion 1606 from the interior of second portion 1604.

The use of barrier member 1662 can also provide for the separation of different temperature zones within food thermometer 1600 to allow for the monitoring of different safe temperature limits corresponding to a minimum food insertion depth indicator 1664, which may include a shallow groove, abraded marking, weld line, or other visual indicator on the exterior of food thermometer 1600 to indicate a minimum depth for inserting food thermometer 1600 into food. Some implementations may also include a thermal barrier between third portion 1602 and second portion 1604.

In this regard, food thermometer 1600 in FIGS. 16A and 16B differs from thermometers 900E and 1000 in that it includes a thermal barrier that is located in first portion 1606, which includes more temperature sensitive electronics 1620, such as battery 1620*b* and circuitry on PCB 1620*a*. As shown in FIGS. 16A and 16B, first portion 1606 includes first metallic outer shell 1644*a* and tip portion 1612, which is configured to pierce food, while second portion 1604 includes second metallic outer shell 1644*b*. In the example of FIGS. 16A and 16B, the boundary between first portion 1606 and second portion 1604 can be considered where first metallic outer shell 1644*a* meets or is closest to second metallic outer shell 1644*b*. In the example of FIG. 16B, first metallic outer shell 1644*a* and second metallic outer shell 1644*b* are joined together, such as by welding (e.g., laser welding). The boundary between second portion 1604 and third portion 1602 can be where hilt 1616 is closest to or meets second outer metallic shell 1644*b*.

Other food thermometers, such as food thermometers 900E and 1000 in FIGS. 11E and 12, may include a thermal barrier at or adjacent to where third portion 1602 meets coaxial transmission portion 1658 of inner shell 1652. By moving a thermal barrier farther towards tip portion 1612 or by adding a thermal barrier to a food thermometer at or adjacent to an orthogonally projected position of the minimum food insertion depth indicator onto the virtual central axis, or adding a thermal barrier that is closer to a tip portion than such a minimum food insertion depth indicator, it is ordinarily possible to create an additional temperature measuring region between the ambient temperature sensor 1640 and first portion 1606, or within second portion 1604. In addition, locating the thermal barrier closer to or within first portion 1606 where temperature sensitive electronics 1620 are located can further safeguard such temperature sensitive electronics 1620 from heat. For example, for some types of food, a significant amount of second portion 1604 may be exposed outside of the food, and thereby be subjected to high ambient temperatures inside a cooking appliance. The addition of a thermal barrier closer to or within first portion 1606 can better protect against such high temperatures reaching the temperature sensitive electronics 1620.

As noted above, thermal sensor 1638 is configured to measure an intermediate temperature in the second portion 1604 between first portion 1606 and third portion 1602. In the example of FIG. 16B, thermal sensor 1638 is located near barrier member 1662 and may be part of pipe member 1666 to provide an alarm on a user interface of an electronic device in communication with the food thermometer 1600 to request that the user remove the food thermometer 1600 from heat or to ensure that the food thermometer 1600 is inserted into the food at least up to minimum food insertion depth indicator 1664. In the example of FIG. 16B, barrier member 1662 is located closer to tip portion 1612 than minimum food insertion depth indicator 1664 as a safeguard against users not inserting food thermometer 1600 far enough into the food to at least minimum food insertion depth indicator 1664. In other implementations, such as the arrangement shown in FIG. 17B discussed below, a thermal barrier member may be located at or adjacent to an orthogonally projected position of a minimum food insertion depth indicator onto a central axis of the food thermometer. In some implementations, the temperature to trigger the alarm can be, for example 200° C.

Electronics located in second portion 1604 and closer to third portion 1602 than barrier member 1662, such as thermal sensor 1638 and inner shell 1652, may have a higher safe operating temperature or better maintain a structural integrity at higher temperatures (e.g., between 300° C. and 400°) than electronics located closer to tip portion 1612 than barrier member 1662. In some implementations, electronics located in third portion 1602, such as ambient temperature sensor 1640, may have even higher safe operating temperatures or may better maintain structural integrity at even higher temperatures than electronics located in second portion 1604, such as between 400° C. and 500° C.

Other temperature thresholds can be used for other portions of food thermometer 1600. For example, if any one of internal food thermal sensors 1636*a*, 1636*b*, 1636*c*, 1636*d*, or 1636*e* in first portion 1606 measures a temperature exceeding 100° C., an alert can be triggered on a user interface of an electronic device to instruct the user remove the food thermometer 1600 from heat. In another example, if ambient thermal sensor 1640 in third portion 1602 measures a temperature exceeding 400° C., an alert can be triggered on the user interface to remove the food thermometer 1600 from heat. In yet another example, thermal sensors located in first portion 1606 may have different temperature thresholds for triggering a high temperature alert depending on their location. For example, thermal sensor 1636*b* located closer to battery 1620*b* than thermal sensor 1636*e*, may be associated with a lower temperature threshold than a temperature threshold associated with thermal sensor 1636*e* farther from battery 1620*b*.

Pipe member 1666 is arranged to electrically isolate second metallic outer shell 1644*b* from charging contact 1650 and/or inner shell 1652, which serves as antenna portion 1626. In addition, pipe member 1666 serves as a thermally insulating member to further thermally separate the interior of third portion 1602 from the interior of second portion 1604 and the interior of first portion 1606. In this regard, a combination of pipe member 1666 and barrier member 1662 can provide a thermally insulating region in an intermediate portion (i.e., portion 1604) of food thermometer 1600 between a high temperature section closer to third portion 1602 or hilt 1616 and a lower temperature section closer to first portion 1606 or tip portion 1612.

Pipe member 1666 can include a ceramic material or other high temperature insulating material, such as glass. The use of a ceramic material for pipe member 1666 is especially beneficial for improving the mechanical strength, stress, strain, impact resistance, and aesthetic appearance of the food thermometer, since pipe flange 1667 of pipe member 1666 is exposed to the exterior of the food thermometer 1600. In other implementations, pipe member 1666 can include glass, but the use of ceramic is preferred, since ceramic is less likely to chip or crack, and may provide a better aesthetic appearance. In yet other implementations, pipe member 1666 may be omitted since air can provide thermal insulation in combination with barrier member 1662.

As shown in the example of FIGS. 16A and 16B, the left end of pipe member 1666 is configured to abut barrier member 1662 and may be joined to barrier member 1662 using an adhesive, for example, and/or may be press fit into outer shell 1644*b* and fitting 1668 so as to contact or be positioned near barrier member 1662. A majority of the portion of pipe member 1666 to the left of pipe flange 1667 fits into first metallic outer shell 1644*a*. Lip 1663 of pipe member 1666 may be used as a contact point, together with the axially extending (i.e., in a direction along a center axis of pipe member 1666) outside surface of barrier member 1662, for first metallic outer shell 1644*a*.

Pipe flange 1667 of pipe member 1666 abuts the right end of second metallic outer shell 1644*b* on the left side of the flange and is exposed to the exterior of food thermometer 1600. The opposite side of pipe flange 1667 of pipe member 1666 abuts fitting 1668, which may include a metallic material, such as stainless-steel. Fitting flange 1669 of fitting 1668 abuts hilt 1616, and the cylinder of fitting 1668 extending to the right of fitting flange 1669 fits into hilt 1616 as a contact surface for attaching hilt 1616. In other implementations, fitting 1668 may also serve as a seal to thermally separate third portion 1602 from second portion 1604.

However, in the example of FIGS. 16A and 16B, second portion 1604 serves as a temperature gradient zone with a high temperature region toward the end of second portion 1604 closest to third portion 1602 (e.g., subjected to high temperatures of 300° C. to 400° C., for example), and a lower temperature region toward the end of second portion 1604 closest to first portion 1606 (e.g., subjected to lower temperatures of 100° C. to 200° C., for example).

As noted above, pipe member 1666, which may be formed of a ceramic, can also electrically separate components of third portion 1602 from a remainder of food thermometer 1600. In more detail, exposed pipe flange 1667 electrically separates the outer shell 1644 from electrically conductive material in a remaining portion of the food thermometer by preventing electrical contact between second metallic outer shell 1644*b* and fitting 1668 and/or hilt 1616, which may include metal material. In addition, the use of a thermally insulating material, such as a ceramic, for pipe member 1666 can help thermally protect any seals of barrier member 1662 with an inner surface of first metallic outer shell 1644*a* and/or inner shell 1652.

As will be appreciated by those of ordinary skill in the art, other arrangements of food thermometer 1600 are possible, while still including a barrier member 1662 to thermally separate or isolate the interior of first portion 1606 relative to a minimum food insertion depth indicator on an exterior of the food thermometer 1600. For example, in other implementations, tip portion 1612 may be integrally formed with first metallic outer shell 1644*a*, such as by metal casting, as opposed to being a separate component, as shown in the example of FIG. 16A.

In the example of FIG. 16A, tip portion 1612 is shown as a separate component, which can allow for the manufacture of a thinner wall thickness for tip portion 1612 and first metallic outer shell 1644*a*, while still using a smaller diameter for the first metallic outer shell 1644*a* than would otherwise be possible if tip portion 1612 were integrally formed with first metallic outer shell 1644*a* as a single component. For example, when tip portion 1612 and first metallic outer shell 1644*a* are a single component, an exterior wall thickness of approximately 0.15 mm or less for tip portion 1612 and first metallic outer shell 1644*a* may not allow for a swaging process to round the end of tip portion 1612 if first metallic outer shell 1644*a* has an outer diameter of 4.5 mm or less. However, if tip portion 1612 and first metallic outer shell 1644*a* are separate components, a swaging process can be performed on just tip portion 1612 before it is joined to outer shell 1644, while having dimensions such as an exterior wall thickness of approximately 0.15 mm or less, and an outer diameter of 4.5 mm or less, and preferably approximately 3.5 mm or less.

A thinner wall thickness can provide for better temperature sensing, and a thinner diameter of the food thermometer 1600 desirably results in a smaller hole being made in the food when the food thermometer is inserted, in addition to improving the aesthetic appearance of the food thermometer. As another advantage, a separate tip portion 1612 also ordinarily provides a stronger construction when using a relative thin wall thickness, such as 0.15 mm or less, after the tip portion 1612 is welded (e.g., laser welded) to first metallic outer shell 1644*a* than when tip portion 1612 and first metallic outer shell 1644*a* are integrally formed. In addition, the resulting thinner wall of tip portion 1612 due to using a separate tip, can create room in a recess of the tip portion for a thermal sensor, as shown in FIG. 16B with sensor 1636*a* located in a recess of the tip portion 1612. Oftentimes, the coldest part of the food during cooking is located near the tip portion, and having a temperature measurement from this location can be especially useful for determining whether a particular cooking stage has been reached, estimating a completion time, or estimating a resting temperature rise. A coldest temperature detected or measured at a given time from among thermal sensors located in the first portion may be used in some implementations for determining at least one of a rate at which the indication of food temperature changes and whether to progress a recipe to a next stage of cooking.

As another example variation, the minimum insertion depth indicator 1664 may be located where first metallic outer shell 1644a meets second metallic outer shell 1644b. As yet another example variation, barrier member 1662 may be located in second portion 1604, as in the example of FIGS. 17A and 17B discussed below, while still being axially located (i.e., along a center axis of outer shell 1644) at or adjacent to an orthogonally projected position of the minimum food insertion depth indicator or closer to a tip portion than the minimum food insertion depth indicator. In yet other examples where the first metallic outer shell 1644a and the second metallic outer shell 1644b are integrally formed as a single component, such as by metal casting, barrier member 1662 may be axially located at or adjacent to a minimum food insertion depth indicator, or closer to a tip portion than such a minimum food insertion depth indicator.

Those of ordinary skill in the art will also appreciate that references to "right" or "left" are in the context of the components as shown in FIGS. 16A and 16B to provide a description of the relative arrangement of the components, such that "right" and "left" may be reversed, or replaced by "top" and "bottom" for other orientations of food thermometer 1600.

FIG. 17A is an assembly view of food thermometer 1700 including a thermal barrier member 1762 that uses a hermetic glass-to-metal seal axially located (i.e., in a direction parallel to a center virtual axis of food thermometer 1700) in a middle portion (i.e., second portion 1704) of food thermometer 1700. FIG. 17B is an assembled cross-section view of food thermometer 1700. The like numbers in the 1700's range refer to similar components discussed above in the 1600's range for the food thermometer 1600.

As shown in the example of food thermometer 1700 in FIGS. 17A and 17B, the construction of the food thermometer 1700 can be similar to that of food thermometer 1600 discussed above with reference to FIGS. 16A and 16B. As with the example of food thermometer 1600 discussed above, the combination of the charging contact 1750 and the inner shell 1752 in FIGS. 17A and 17B can serve as a charging path for charging the battery 1720b in the first portion 1706 of the food thermometer 1700.

Food thermometer 1700 in FIGS. 17A and 17B includes an inner shell 1752 that is used as at least part of an antenna in an antenna portion 1726 of the inner shell 1752, and also used as part of a coaxial wave guide with the outer shell 1744 (i.e., including first metallic outer shell 1744a and second metallic outer shell 1744b) in a coaxial transmission portion 1758 of the inner shell 1752. As shown in FIG. 17A, outer shell 1744 defines a virtual axis through a center of outer shell 1744. In addition, food thermometer 1700 includes charging contact 1750, ambient thermal sensor 1740, and thermal sensor wiring 1742 for ambient thermal sensor 1740. Antenna portion 1726 of the inner shell 1752 can form part of an antenna in third portion 1702. In the example of FIGS. 17A and 17B, the antenna may include metal components located in third portion 1702, which can include hilt 1716, fitting 1768, and charging contact 1750, all of which may be formed of stainless-steel, for example. In other implementations, hilt 1716 may additionally or alternatively include a ceramic material for handling of the food thermometer, as discussed above for hilts or handles of other food thermometers disclosed herein.

As shown in FIGS. 17A and 17B, connection adapter 1760 allows connection of sensor wiring 1742 and inner shell 1752 to PCB 1720a, such as by soldering. Inner shell 1752 can be made of a conductive material such as copper, which can transmit a signal from PCB 1720a or other electronics in the first or second portions of the thermometer 1700 to the antenna 1726 in the third portion 1702 for transmission to an electronic device, such as electronic device 110 in FIG. 12. In this regard, the inner shell 1752 serves as antenna 1726 in the third portion 1702, and may also be used to wirelessly receive signals or data from an electronic device for processing by circuitry of PCB 1720a.

In some implementations, inner shell 1752 and sensor wiring 1742 may form part of a Mineral Insulated (MI) cable, such as with a copper inner shell 1752 and copper sensor wiring 1742 and magnesium oxide filling the space between the sensor wiring 1742 and inner shell 1752. Other Mineral Insulated Metal Sheathed (MIMS) cables may alternatively be used, such as where inner shell 1752 is stainless-steel. Such MI or MIMS cables can allow for a smaller diameter inner shell 1752, which can free up space for a smaller overall outside diameter of food thermometer 1700. Other implementations may use another dielectric material, such as air, as an insulator between the sensor wiring 1742 and the inner shell 1752 to reduce interference between the temperature signal from ambient thermal sensor 1740 and the antenna signal. In some implementations, sensor wiring 1742 may only include a single sensor wire for thermal sensor 1740, and may use inner shell 1752 as a second sensor wire for thermal sensor 1740.

The coaxial transmission portion 1758 of the inner shell 1752 is located within the second metallic outer shell 1744b and partially within the first metallic outer shell 1744a, both of which can include a stainless-steel material. The outer shells 1744 work with the coaxial transmission portion 1758 of the inner shell 1752 to serve as a waveguide so that an antenna RF signal is generally confined between the outer shells 1744 and the inner shell 1752.

The thermal sensor wiring 1742 and the ambient thermal sensor 1740 are located inside the inner shell 1752, which generally shields them from the antenna RF signal between the inner shell 1752 and the outer shells 1744a and 1744b. As a result, interference is reduced in both the temperature signal conducted in the sensor wiring 1742 and the antenna RF signal conducted in the coaxial transmission waveguide. In other words, placing the sensor wiring 1742 inside the inner shell 1752 can ordinarily reduce RF influence on the antenna signal and interference in the temperature signal carried in the sensor wiring 1742.

In the example of FIGS. 17A and 17B, the ambient thermal sensor 1740 indirectly measures the ambient temperature through the charging contact 1750 and its wiring, which may only carry a signal when food thermometer 1700 is being charged or programmed (e.g., a firmware update), such as when food thermometer 1700 is in a charging device (e.g., charging device 700 in FIGS. 9A and 9B) and not using antenna portion 1726 for RF communications. The use of ambient thermal sensor 1740 in third portion 1702 can allow for the measurement of the ambient temperature near or adjacent to an exterior surface of the food when thermometer 1700 is inserted into the food. In some implementations, the ambient thermal sensor 1740 can include a thermocouple.

Thermal barrier member 1762 is configured to thermally insulate the interior of first portion 1706 from at least a portion of the interior of second portion 1704 and protect against heat from conducting from a side of barrier member 1762 closest to hilt 1716 toward an opposite side of barrier member 1762 closest to tip portion 1712. In the example of FIGS. 17A and 17B, barrier member 1762 forms a hermetic or air tight, glass-to-metal seal with an interior surface of second metallic outer shell 1744b. The glass-to-metal seal may be formed by, for example, choosing a glass material for barrier member 1762 that has a similarly matched, but slightly lower, coefficient of thermal expansion than the metal material used for second metallic outer shell 1744b. Barrier member 1762 may then be formed by heating the glass to a molten state, and placing the molten glass at the location for barrier member 1762 with wetting within second metallic outer shell 1744b so that as the second metallic outer shell 1744b cools, it contracts slightly more than the glass to place the glass under compression and form a hermetic seal. A glass-to-metal seal for barrier member 1762 can allow for the seal to remain intact at high temperatures of, for example, 400° C. to 500° C. and thereby locate barrier member 1762 in second portion 1704 farther toward hilt 1716. In the example of FIG. 17B, the use of a glass-to-metal seal can allow for barrier member 1762 to be axially located (i.e., in a direction parallel to a central axis of food thermometer 1700) at or adjacent to minimum food insertion depth indicator 1764a, where barrier member 1762 and its seal or seals may not be thermally protected by the food, or more likely to only be partially protected by a periphery of the food. In other implementations, the minimum food insertion depth indicator may instead be located closer toward tip portion 1712 at the location indicated by 1764b. In such implementations, thermal barrier member 1762 is still located in second portion 1704 (i.e., a middle portion of food thermometer 1700), but is located closer to third portion 1702 or hilt 1716 without being at or adjacent to the minimum food depth insertion indicator.

In addition, less adhesive can be used than in the example of thermal barrier member 1662 discussed above for FIGS. 16A and 16B, since only some adhesive may be used at one inner seal between inner shell 1752 and a center of thermal barrier member 1762, without needing adhesive at an outer seal between thermal barrier member 1762 and the internal surface of second metallic outer shell wall 1766b that is subjected to higher temperatures than the inner seal. The glass can also pass RF signals along coaxial transmission portion 1758 without significant signal loss, and is a food-safe material.

As discussed above, the use of a barrier member, such as barrier member 1762, can provide for the separation of different temperature zones within food thermometer 1700 to allow for the monitoring of different safe temperature limits corresponding to a minimum food insertion depth indicator 1764a, which may include a shallow groove, abraded marking, weld line, or other visual indicator on the exterior of food thermometer 1700 to indicate a minimum depth for inserting food thermometer 1700 into food. Some implementations may also include a thermal barrier between third portion 1702 and second portion 1704.

In this regard, food thermometer 1700 in FIGS. 17A and 17B differs from thermometers 900E and 1000 in that it includes a thermal barrier that is located in second portion 1704, which provides additional thermal protection (in addition to the thermal protection provided by the food) for temperature sensitive electronics 1720, such as battery 1720b and circuitry on PCB 1720a. As shown in FIGS. 17A and 17B, first portion 1706 includes first metallic outer shell 1744a and tip portion 1712, which is configured to pierce food, while second portion 1704 includes second metallic outer shell 1744b. In the example of FIGS. 17A and 17B, the boundary between first portion 1706 and second portion 1704 can be considered where first metallic outer shell 1744a meets or is closest to second metallic outer shell 1744b. In the example of FIG. 17B, first metallic outer shell 1744a and second metallic outer shell 1744b are joined together, such as by welding (e.g., laser welding) at lip 1765 of second metallic outer shell 1744b. The boundary between second portion 1704 and third portion 1702 can be where hilt 1716 is closest to or meets second outer metallic shell 1744b.

By adding a thermal barrier to a food thermometer at or adjacent to an axial location of a minimum food insertion depth indicator, or adding a thermal barrier that is closer to a tip portion than a hilt or handle of the food thermometer, it is ordinarily possible to create an additional temperature measuring region between the ambient temperature sensor 1740 and first portion 1706, or within second portion 1704. In addition, locating the thermal barrier closer to or within first portion 1706 where temperature sensitive electronics 1720 are located can further safeguard such temperature sensitive electronics 1720 from heat. For example, for some types of food, a significant amount of second portion 1704 may be exposed outside of the food, and thereby be subjected to high ambient temperatures inside a cooking appliance. The addition of a thermal barrier closer to first portion 1706 can better protect against such high temperatures reaching the temperature sensitive electronics 1720.

As noted above, thermal sensor 1738 is configured to measure an intermediate temperature in the second portion 1704 between first portion 1706 and third portion 1702. In the example of FIG. 17B, thermal sensor 1738 is located near barrier member 1762 and adjacent to minimum food insertion indicator 1764a to provide an alarm on a user interface of an electronic device in communication with the food thermometer 1700 to request that the user remove the food thermometer 1700 from heat or to ensure that the food thermometer 1700 is inserted into the food at least up to minimum food insertion depth indicator 1764a. In the example of FIG. 17B, and unlike the example of FIG. 16B, barrier member 1762 is located closer to hilt 1716 than minimum food insertion depth indicator 1764a to provide an earlier indication via thermal sensor 1738 of an ambient temperature in the cooking appliance reaching an unsafe operating temperature. In other implementations, such as the arrangement shown in FIG. 16B discussed above, a thermal barrier member may be located closer to a tip portion than a minimum food insertion depth indicator. In some implementations, the temperature to trigger the alarm can be, for example 300° C.

In addition, and in contrast to the example of food thermometer 1600 discussed above, the example of food thermometer 1700 in FIG. 17B locates thermal sensor 1738 closer to tip portion 1712 than the location of barrier member 1762. Such a sensor location may more quickly detect situations where the food thermometer 1700 has been inserted into food to a depth that is almost as deep as the minimum food insertion indicator 1764a.

Electronics located in second portion 1704 and closer to third portion 1702 than barrier member 1762, such as inner shell 1752, may have a higher safe operating temperature or better maintain a structural integrity at higher temperatures than electronics located closer to tip portion 1712 than barrier member 1762. In some implementations, electronics located in third portion 1702, such as ambient temperature sensor 1740, may have higher safe operating temperatures or better maintain structural integrity at even higher temperatures than electronics located in second portion 1704, such as between 400° C. and 500° C.

Other temperature thresholds can be used for other portions of food thermometer 1700. For example, if any one of internal food thermal sensors 1736*a*, 1736*b*, 1736*c*, 1736*d*, or 1736*e* in first portion 1706 measures a temperature exceeding 100° C., an alert can be triggered on a user interface of an electronic device to instruct the user remove the food thermometer 1700 from heat. In another example, if ambient thermal sensor 1740 in third portion 1702 measures a temperature exceeding 400° C., an alert can be triggered on the user interface to remove the food thermometer 1700 from heat. In yet another example, thermal sensors located in first portion 1706 may have different temperature thresholds for triggering a high temperature alert depending on their location. For example, thermal sensor 1736*b* located closer to battery 1720*b* than thermal sensor 1736*e*, may be associated with a lower temperature threshold than a temperature threshold for thermal sensor 1736*e* farther from battery 1720*b*.

Pipe member 1766 is arranged to electrically isolate second metallic outer shell 1744*b* from charging contact 1750 and/or inner shell 1752, which serves as antenna 1726. In addition, pipe member 1766 serves as a thermally insulating member to further thermally separate the interior of third portion 1702 from at least a portion of the interior of second portion 1704 and the interior of first portion 1706. Unlike pipe member 1666 in the example of FIG. 16B discussed above, pipe member 1766 in FIG. 17B is shorter and does not extend throughout the entirety of second portion 1704, since one or more seals of barrier member 1762 in FIG. 17B can withstand higher temperatures than seals of barrier member 1662 in FIG. 16B.

In this regard, a combination of pipe member 1766 and barrier member 1762 can provide a thermally insulating region in an intermediate portion (i.e., portion 1704) of food thermometer 1700 between a high temperature section closer to third portion 1702 or hilt 1716 and a lower temperature section closer to first portion 1706 or tip portion 1712.

Pipe member 1766 can include a ceramic material or other high temperature insulating material, such as glass. The use of a ceramic material for pipe member 1766 is especially beneficial for improving the mechanical strength, stress, strain, impact resistance, and aesthetic appearance of food thermometer 1700, since pipe flange 1767 of pipe member 1766 is exposed to the exterior of the food thermometer 1700. In other implementations, pipe member 1766 can include glass, but the use of ceramic is preferred, since ceramic is less likely to chip or crack, and may provide a better aesthetic appearance. In yet other implementations, pipe member 1766 may be omitted since air can provide thermal insulation in combination with barrier member 1762.

As shown in the example of FIGS. 17A and 17B, the left end of pipe member 1766 is configured to abut barrier member 1762 and may be press fit into outer shell 1744*b* and fitting 1768 so as to contact or be located near barrier member 1762. The outside of barrier member 1762 and the reduced diameter left end of pipe member 1766 fit into second metallic outer shell 1744*b*. In this regard, pipe member 1766 may be formed of a thermally insulating material, such as a ceramic, to further protect against the conduction of heat past the minimum food insertion depth indicator 1764*a* axially located at or adjacent to barrier member 1762. As noted above, the glass-to-metal seal of barrier member 1762 and the inner surface of second metallic outer shell 1744*b* may provide a hermetic seal and an adhesive or a second glass-to-metal seal may be used to hermetically seal an inner hole for inner shell 1752.

Pipe flange 1767 on pipe member 1766 abuts the left end of second metallic outer shell 1744*b* on the left side of pipe flange 1767 and is exposed to the exterior of food thermometer 1700. The opposite side of pipe flange 1767 abuts fitting flange 1769 of fitting 1768. The opposite side of fitting flange 1769 abuts hilt 1716, and the recessed cylinder of fitting 1768 extending to the right of fitting flange 1769 fits into hilt 1716 to as a contact surface for attaching hilt 1716, such as with a press fitting, welding (e.g., laser welding), or a high temperature adhesive. In other implementations, fitting 1768 may also serve as a seal to thermally separate third portion 1702 from second portion 1704.

However, in the example of FIGS. 17A and 17B, second portion 1704 serves as a temperature gradient zone with a high temperature region toward the end of second portion 1704 closest to third portion 1702 (e.g., subjected to high temperatures of 300° C. to 400° C., for example), and a lower temperature region toward the end of second portion 1704 closest to first portion 1706 (e.g., subjected to lower temperatures of 100° C. to 200° C., for example).

As noted above, pipe member 1766, which may be formed of a ceramic, can also electrically separate components of third portion 1702 from a remainder of food thermometer 1700. In more detail, exposed pipe flange 1767 electrically separates outer shell 1744 from electrically conductive material in a remaining portion of the food thermometer by preventing electrical contact between second metallic outer shell 1744*b* and fitting 1768 and/or hilt 1716, which may include metal material. In addition, the use of a thermally insulating material, such as a ceramic, for pipe member 1766 can protect the hermetic glass-to-metal seal of barrier member 1762 and a hermetic inner seal of barrier member 1762 with inner shell 1752.

As will be appreciated by those of ordinary skill in the art, other arrangements of food thermometer 1700 are possible, while still including a barrier member 1762 to thermally protect the interior of first portion 1706 relative to a minimum food insertion depth indicator on an exterior of the food thermometer 1700. For example, in other implementations, tip portion 1712 may be integrally formed with first metallic outer shell 1744*a*, as opposed to being a separate component, as shown in the example of FIG. 17A.

In the example of FIG. 17A, tip portion 1712 is shown as a separate component, which as noted above, can allow for the manufacture of a thinner wall thickness for tip portion 1712 and first metallic outer shell 1744*a*, while still using a smaller diameter for the first metallic outer shell 1744*a* than would otherwise be possible if tip portion 1712 were integrally formed with first metallic outer shell 1744*a* as a single component, such as by metal casting. For example, when tip portion 1712 and first metallic outer shell 1744*a* are a single component, an exterior wall thickness of approximately 0.15 mm or less for tip portion 1712 and first metallic outer shell 1744*a* may not allow for a swaging process to round the end of tip portion 1712 if first metallic outer shell 1744*a* has an outer diameter of 4.5 mm or less. However, if tip portion 1712 and first metallic outer shell 1744*a* are separate components, a swaging process can be performed on just tip portion 1712 before it is jointed to outer shell 1744, while having dimensions such as an exterior wall thickness of approximately 0.15 mm or less, and an outer diameter of 4.5 mm or less, and preferably approximately 3.5 mm or less.

A thinner wall thickness can provide for better temperature sensing, and a thinner diameter of food thermometer 1700 desirably results in a smaller hole being made in the food when the food thermometer is inserted, in addition to improving the aesthetic appearance of the food thermometer. As another advantage, a separate tip portion 1712 also ordinarily provides a stronger construction when using a relative thin wall thickness, such as 0.15 mm or less, after the tip portion 1712 is welded (e.g., laser welded) to first metallic outer shell 1744*a* than when tip portion 1712 and first metallic outer shell 1744*a* are integrally formed. In addition, the resulting thinner wall of tip portion 1712 due to using a separate tip, can create room for a recess in the tip portion 1712 to house a thermal sensor, as shown in FIG. 17B with sensor 1736*a* located in a recess of tip portion 1712. Oftentimes, the coldest part of the food during cooking is located near the tip portion, and having a temperature measurement from this location can be especially useful for determining whether a particular cooking stage has been reached, estimating a completion time, and estimating a resting temperature rise. As noted above, a coldest temperature detected or measured at a given time from among thermal sensors located in the first portion may be used in some implementations to determine at least one of a rate at which the indication of food temperature changes and whether to progress a recipe to a next stage of cooking.

As another example variation, the minimum insertion depth indicator 1764*a* may be located at 1764*b* or where first metallic outer shell 1744*a* meets second metallic outer shell 1744*b*. As yet another example variation, barrier member 1762 may be located in first portion 1706, as in the example of FIGS. 16A and 16B discussed above, with barrier member 1662 in FIG. 16B being located closer to a tip portion than the minimum food insertion depth indicator. In yet other examples where the first metallic outer shell 1744*a* and the second metallic outer shell 1744*b* are integrally formed as a single component, such as with metal casting, barrier member 1762 may still be axially located at or adjacent to a minimum food insertion depth indicator, as in FIG. 17B or closer to a tip portion than such a minimum food insertion depth indicator, as in FIG. 16B.

Those of ordinary skill in the art will also appreciate that references to "right" or "left" are in the context of the components as shown in FIGS. 17A and 17B to provide a description of the relative arrangement of the components, such that "right" and "left" may be reversed, or replaced by "top" and "bottom" for other orientations of food thermometer 1700.

Those of ordinary skill in the art will also appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or control circuitry to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a CPU, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, an SoC, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC or an SoC.

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the scope of the present disclosure. The described embodiments are to be considered in all respects only as illustrative and not restrictive. In addition, the use of language in the form of "at least one of A and B" in the following claims should be understood to mean "only A, only B, or both A and B."

What is claimed is:

1. A food thermometer, comprising:
a tip portion configured to pierce food;
an outer shell including a minimum food insertion depth indicator visible on an exterior of the outer shell, wherein the outer shell defines a virtual axis through a center of the outer shell;
a thermal barrier member located inside the outer shell and at an axial location along the virtual axis of at least one of:
at or adjacent to an orthogonally projected position of the minimum food insertion depth indicator on the virtual axis, and
closer to the tip portion than the orthogonally projected position of the minimum food insertion depth indicator;
electronics located in the tip portion or closer to the tip portion than the thermal barrier members; and
a thermally insulating member located at least partially inside the outer shell and abutting the thermal barrier member on a side of the thermal barrier member that is farthest from the tip portion along the virtual axis.

2. The food thermometer of claim 1, wherein the electronics include a battery.

3. The food thermometer of claim 1, wherein the thermal barrier member includes a glass-to-metal seal with an inner surface of the outer shell.

4. The food thermometer of claim 1, wherein the thermally insulating member includes a ceramic material.

5. The food thermometer of claim 1, wherein a portion of the thermally insulating member is exposed to an exterior of the food thermometer and electrically separates the outer shell from electrically conductive material in a remaining portion of the food thermometer opposite the tip portion.

6. The food thermometer of claim 1, wherein the tip portion is manufactured as a separate component from the outer shell before the tip portion is joined to the outer shell.

7. The food thermometer of claim 1, wherein the tip portion includes a recess that houses a thermal sensor.

8. The food thermometer of claim 1, wherein a recess of the tip portion has an exterior wall thickness of approximately 0.15 mm or less, and wherein an outer diameter of the outer shell is 4.5 mm or less.

9. The food thermometer of claim 1, further comprising:
an inner shell located inside the outer shell; and
wiring located inside the inner shell, wherein the inner shell and the wiring form at least part of a Mineral Insulated (MI) cable or Mineral Insulated Metal Sheathed (MIMS) cable.

10. The food thermometer of claim 1, further comprising a first thermal sensor inside the outer shell at a location that is at least one of adjacent to the thermal barrier member and between the thermal barrier and the orthogonal projection of the minimum food insertion depth indicator to the virtual axis.

11. The food thermometer of claim 10, further comprising a second thermal sensor located inside the tip portion or closer to the tip portion in a direction along the virtual axis than the first thermal sensor, wherein a temperature detected by the first thermal sensor is configured to trigger a first high temperature alert at a first temperature threshold and a temperature detected by the second thermal sensor is configured to trigger a second high temperature alert at a second temperature threshold, and wherein the first temperature threshold is greater than the second temperature threshold.

12. The food thermometer of claim 11, further comprising:
a hilt portion opposite the tip portion, wherein the outer shell is located between the hilt portion and the tip portion; and
a third thermal sensor located in the hilt portion, wherein a temperature detected by the third thermal sensor is configured to trigger a third high temperature alert at a third temperature threshold that is greater than the first temperature threshold.

13. The food thermometer of claim 1, further comprising a plurality of thermal sensors configured to measure an internal temperature of food, wherein each thermal sensor of the plurality of thermal sensors is located in the tip portion or closer to the tip portion in a direction along the virtual axis than the thermal barrier member, and wherein a coldest indication of food temperature detected from among temperatures detected by the plurality of thermal sensors at a given time is used to determine at least one of a rate at which the indication of food temperature changes and whether to progress a recipe to a next stage of cooking.

14. The food thermometer of claim 1, further comprising a charging contact at an end of the food thermometer opposite the tip portion, wherein at least a portion of the electronics in the food thermometer that is used for wireless communication is powered off when the charging contact receives a charging signal and powered on when the charging contact does not receive a charging signal.

15. A food thermometer, comprising:
a first portion configured to be positioned in food and including electronics that are sensitive to heat, wherein the first portion includes at least one thermal sensor for detecting the temperature of the food;
a second portion connected to the first portion;
a third portion connected to the second portion, the third portion including an antenna for wirelessly transmitting data based on the detected temperature of the food;
a thermal barrier member located in at least one of the first portion and the second portion, wherein the thermal barrier member is configured to thermally insulate an interior of the first portion from at least one of at least a portion of an interior of the second portion and an interior of the third portion; and
a thermally insulating member including a flange exposed to an exterior of the food thermometer, the flange comprising an electrically insulating material configured to electrically separate an exterior of the second portion from metal components of the third portion.

16. The food thermometer of claim 15, wherein the thermal barrier member includes a glass-to-metal seal.

17. The food thermometer of claim 15, wherein the thermally insulating member is located at least partially in the second portion and abuts the thermal barrier member on a side of the thermal barrier member closest thereto from the third portion.

18. The food thermometer of claim 17, wherein the thermally insulating member includes a ceramic material.

19. The food thermometer of claim 15, wherein the first portion includes a tip portion configured to pierce food, and wherein the tip portion is manufactured as a separate component from a remainder of the first portion before being joined to the first portion.

20. The food thermometer of claim 19, wherein a recess of the tip portion houses a thermal sensor.

21. The food thermometer of claim 19, wherein the tip portion includes a recess with an exterior wall thickness of approximately 0.15 mm or less, and wherein an outer diameter of the second portion is 4.5 mm or less.

22. The food thermometer of claim 15, further comprising:
an inner shell located inside at least the second portion; and
wiring located inside the inner shell, wherein the inner shell and wiring form at least part of a Mineral Insulated (MI) cable or Mineral Insulated Metal Sheathed (MIMS) cable.

23. The food thermometer of claim 15, further comprising a first thermal sensor inside the second portion at a location that is least one of adjacent to the thermal barrier member and between the thermal barrier and an orthogonal projection of a minimum food insertion depth indicator toward a center virtual axis of the food thermometer, wherein the minimum food insertion depth indicator is visible on an exterior of the second portion.

24. The food thermometer of claim 23, further comprising a second thermal sensor located in the first portion, wherein a temperature detected by the first thermal sensor is configured to trigger a first high temperature alert at a first temperature threshold and a temperature detected by the second thermal sensor is configured to trigger a second high temperature alert at a second temperature threshold, and wherein the first temperature threshold is greater than the second temperature threshold.

25. The food thermometer of claim 24, further comprising a third thermal sensor located in the third portion, wherein a temperature detected by the third thermal sensor is configured to trigger a third high temperature alert at a third temperature threshold that is greater than the first temperature threshold.

26. The food thermometer of claim 15, wherein the at least one thermal sensor includes a plurality of thermal sensors, and wherein a coldest indication of food temperature detected from among temperatures detected by the plurality of thermal sensors at a given time is used to determine at least one of a rate at which the indication of food temperature changes and whether to progress a recipe to a next stage of cooking.

27. The food thermometer of claim 15, further comprising a charging contact at an end of the third portion, wherein at least a portion of circuitry in the food thermometer that is used for wireless communication is powered off when the charging contact receives a charging signal and powered on when the charging contact does not receive a charging signal.

28. A food thermometer, comprising:
- a tip portion configured to pierce food;
- an outer shell defining a virtual axis through a center of the outer shell, the outer shell including a minimum food insertion depth indicator visible on an exterior of the outer shell;
- a thermal barrier member located inside the outer shell and at an axial location along the virtual axis of at or adjacent to an orthogonally projected position of the minimum food insertion depth indicator on the virtual axis; and
- temperature sensitive electronics located at the tip portion or closer to the tip portion in a direction along the virtual axis than the thermal barrier member.

29. The food thermometer of claim 28, further comprising a thermally insulating member located at least partially inside the outer shell and abutting the thermal barrier member on a side of the thermal barrier member that is farthest from the tip portion along the virtual axis.

30. The food thermometer of claim 28, further comprising a glass-to-metal seal between an inner surface of the outer shell and the thermal barrier member.

* * * * *

UNITED STATES PATENT AND TRADEMARK OFFICE
CERTIFICATE OF CORRECTION

PATENT NO. : 11,946,812 B2
APPLICATION NO. : 17/098365
DATED : April 2, 2024
INVENTOR(S) : Teemu Nivala and Joseph Cruz It is certified that error appears in the above-identified patent and that said Letters Patent is hereby corrected as shown below:

In the Specification

| | | |
|---|---|---|
| Column 1, | Line 12, | change "filed Jul. 17, 2018," to --filed on Jul. 17, 2018,-- |
| Column 1, | Line 13, | change "Jun. 2 2020,which" to --Jun. 2, 2020, which-- |
| Column 26, | Line 63, | change "outer shell 1644*b*," to --outer shell 1644*a*,-- |

In the Claims

| | | | |
|---|---|---|---|
| Claim 1, | Column 38, | Line 61, | change "barrier members; and" to --barrier member; and-- |

Signed and Sealed this
Thirtieth Day of July, 2024

Katherine Kelly Vidal
*Director of the United States Patent and Trademark Office*